United States Patent
Ikuta et al.

(10) Patent No.: US 10,705,605 B2
(45) Date of Patent: Jul. 7, 2020

(54) IMAGE DISPLAY SYSTEM, AND CONTROL APPARATUS FOR HEAD-MOUNTED DISPLAY AND OPERATION METHOD THEREFOR

(71) Applicant: FUJIFILM Corporation, Tokyo (JP)

(72) Inventors: Mayuko Ikuta, Tokyo (JP); Yuki Okabe, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/251,907

(22) Filed: Jan. 18, 2019

(65) Prior Publication Data

US 2019/0155382 A1   May 23, 2019

Related U.S. Application Data

(63) Continuation of application No. PCT/JP2017/025880, filed on Jul. 18, 2017.

(30) Foreign Application Priority Data

Jul. 19, 2016   (JP) .................................. 2016-141384

(51) Int. Cl.
  *G06F 3/01*  (2006.01)
  *G02B 27/01*  (2006.01)
  (Continued)

(52) U.S. Cl.
  CPC .......... *G06F 3/013* (2013.01); *G02B 27/0172* (2013.01); *G06F 16/54* (2019.01);
  (Continued)

(58) Field of Classification Search
  CPC ............ G02B 27/0172; G02B 27/0176; G02B 2027/0138; G02B 2027/014;
  (Continued)

(56) References Cited

U.S. PATENT DOCUMENTS

2003/0117651 A1* 6/2003 Matraszek .............. G06F 16/58
                                                     358/1.18
2008/0154931 A1   6/2008 Jacobs et al.
(Continued)

FOREIGN PATENT DOCUMENTS

JP   2003-233624 A   8/2003
JP   2010-187320 A   8/2010
(Continued)

OTHER PUBLICATIONS

International Search Report issued in PCT/JP2017/025880; dated Oct. 24, 2017.
(Continued)

*Primary Examiner* — Yaron Cohen
(74) *Attorney, Agent, or Firm* — Studebaker & Brackett PC

(57) ABSTRACT

A display control unit causes an accumulation image list screen having a list of accumulation images to be displayed on a head-mounted display. A detection unit detects an eye gaze of a user directed at one of the accumulation images on the basis of a captured image from an eye gaze detection camera of the head-mounted display. A time measurement unit measures an eye fixation duration of the user for the accumulation image. An evaluation unit replaces the eye fixation duration with an interest level of the user for the accumulation image on the basis of evaluation criteria. An information accepting unit accepts the interest level as information about the eye fixation duration. An information management unit records the image ID of the accumulation image and the interest level to a storage device in association with each other as image interest-level information.

10 Claims, 24 Drawing Sheets

(51) Int. Cl.
  *G09G 5/00* (2006.01)
  *H04N 5/64* (2006.01)
  *G06F 16/54* (2019.01)
(52) U.S. Cl.
  CPC .............. *G09G 5/00* (2013.01); *H04N 5/64* (2013.01); *G02B 27/0176* (2013.01); *G02B 2027/014* (2013.01); *G02B 2027/0138* (2013.01); *G02B 2027/0178* (2013.01)
(58) Field of Classification Search
  CPC . G02B 2027/0178; G06F 16/54; G06F 3/013; G09G 5/00; H04N 5/64
  See application file for complete search history.

(56) References Cited

U.S. PATENT DOCUMENTS

| | | |
|---|---|---|
| 2011/0001763 A1 | 1/2011 | Murakami |
| 2014/0002342 A1 | 1/2014 | Fedorovskaya et al. |
| 2014/0054839 A1 | 2/2014 | Umi et al. |
| 2014/0168056 A1* | 6/2014 | Swaminathan .... G06K 9/00604 345/156 |
| 2017/0126907 A1 | 5/2017 | Tamura et al. |
| 2017/0300514 A1 | 10/2017 | Yan et al. |

FOREIGN PATENT DOCUMENTS

| | | |
|---|---|---|
| JP | 2011015301 A | 1/2011 |
| JP | 2013-088906 A | 5/2013 |
| JP | 2014-143595 A | 8/2014 |
| WO | 2015/131571 A1 | 9/2015 |
| WO | 2015/186447 A1 | 12/2015 |

OTHER PUBLICATIONS

Written Opinion issued in PCT/JP2017/025880; dated Oct. 24, 2017.
The extended European search report issued by the European Patent Office dated Jun. 25, 2019, which corresponds to EP17830981.1-1216 and is related to U.S. Appl. No. 16/251,907.
An Office Action; "Notification of Reasons for Refusal," Mailed by the Japanese Patent Office dated Mar. 3, 2020, which corresponds to Japanese Patent Application No. 2018-528541 and is related to U.S. Appl. No. 16/251,907 with English language translation.
Communication Pursuant to Article 94(3) EPC issued by the European Patent Office dated Apr. 15, 2020, which corresponds to EP 17830981.1—1216 and is related to U.S. Appl. No. 16/251,907.

* cited by examiner

FIG. 8

| EVALUATION CRITERIA ~62 | |
|---|---|
| EYE FIXATION DURATION | INTEREST LEVEL |
| 30 SEC. OR MORE | 5 |
| 20 SEC. OR MORE AND LESS THAN 30 SEC. | 4 |
| 10 SEC. OR MORE AND LESS THAN 20 SEC. | 3 |
| 1 SEC. OR MORE AND LESS THAN 10 SEC. | 2 |
| 0 SEC. | 1 |

FIG. 9

63 — IMAGE INTEREST-LEVEL INFORMATION (USER ID: U001)

| IMAGE ID OF ACCUMULATION IMAGE | INTEREST LEVEL |
|---|---|
| P001 | 2 |
| P002 | 2 |
| P003 | 5 |
| P004 | 1 |
| P005 | 4 |

FIG. 10

| SELECTION CONDITION ~64 |
|---|
| INTEREST LEVEL OF 4 OR HIGHER |

IMAGE DISPLAY SYSTEM, AND CONTROL APPARATUS FOR HEAD-MOUNTED DISPLAY AND OPERATION METHOD THEREFOR

CROSS-REFERENCE TO RELATED APPLICATIONS

This application is a Continuation of PCT International Application No. PCT/JP2017/025880 filed on 18 Jul. 2017, which claims priority under 35 U.S.C. § 119(a) to Japanese Patent Application No. 2016-141384 filed on 19 Jul. 2016. The above application is hereby expressly incorporated by reference, in its entirety, into the present application.

BACKGROUND OF THE INVENTION

1. Field of the Invention

The present invention relates to an image display system, and a control apparatus for a head-mounted display and an operation method therefor.

2. Description of the Related Art

A technique is known in which a virtual image formed by using computer graphics is displayed on a head-mounted display (hereinafter referred to as "HMD") that is worn on the head of a user to allow the user to recognize a virtual reality space formed of the virtual image or an augmented reality space obtained by merging the real space with a virtual space.

For example, JP2014-143595A describes a technique in which an image list in which a plurality of images are arranged is displayed on an HMD and an image on which a user continuously fixes their eyes for a predetermined duration or more is reproduced and displayed on the HMD. In JP2014-143595A, an image of the left eye of the user is captured by a camera mounted on the HMD, and the user's eye gaze is detected on the basis of the captured image of the left eye.

SUMMARY OF THE INVENTION

The eye fixation duration for an image is a key indicator indicating the user's interest level for the image. Therefore, information about the eye fixation duration is highly useful. However, in JP2014-143595A, an image for which the eye fixation duration is equal to or longer than a predetermined duration is only reproduced and displayed, and information about the eye fixation duration is not effectively used.

An object of the present invention is to provide an image display system, and a control apparatus for a head-mounted display and an operation method therefor with which information about the eye fixation duration for an image can be effectively used.

To address the issue described above, an image display system according to an aspect of the present invention is an image display system including: a head-mounted display that is worn on a head of a user; and a control apparatus for the head-mounted display. The image display system includes: a display control unit that causes a list in which a plurality of images are arranged to be displayed on the head-mounted display; a detection unit that detects an eye gaze of the user directed at an image among the plurality of images; a time measurement unit that measures an eye fixation duration of the user for the image on the basis of a result of detecting the eye gaze; an information accepting unit that accepts information about the eye fixation duration; and an information management unit that records the image and the information about the eye fixation duration to a storage unit in association with each other.

It is preferable that the image display system further include a selection unit that selects at least one image of interest from among the plurality of images in accordance with the information about the eye fixation duration from the information management unit.

It is preferable that the image display system further include an album creation unit that creates an electronic album constituted by a group of some of the plurality of images, and that in a case where the image of interest is selected, the album creation unit create the electronic album that includes the image of interest.

It is preferable that the display control unit cause the image of interest and the electronic album to be displayed on the head-mounted display, that the image display system further include an addition instruction accepting unit that accepts an addition instruction from the user for adding the image of interest to the electronic album, and that the album creation unit create the electronic album in response to the addition instruction.

It is preferable that the user be one of a plurality of users, and the display control unit cause lists to be displayed on respective head-mounted displays that are worn by the plurality of users. In this case, it is preferable that the image display system further include: a sharing instruction accepting unit that accepts a sharing instruction from the user; and a mode switching unit that switches between a shared mode in which an eye fixation target image is shared among the plurality of users and a non-shared mode in which the eye fixation target image is not shared among the plurality of users, the eye fixation target image being the image in the list at which the eye gaze of the user that has given the sharing instruction, which is an instructing user, is directed.

It is preferable that the display control unit cause a mark to be displayed on the eye fixation target image in each of the lists in the shared mode, and cause the mark to be displayed on one of the plurality of images in each of the lists at which an eye gaze of a corresponding one of the plurality of users is directed in the non-shared mode.

It is preferable that the sharing instruction accepting unit accept the sharing instruction that is given by a spoken utterance of the user.

It is preferable that the image display system further include an evaluation unit that replaces the eye fixation duration with an interest level of the user for the image on the basis of an evaluation criterion, and that the information management unit record the interest level as the information about the eye fixation duration.

It is preferable that the image display system further include a reproduction instruction accepting unit that accepts a reproduction instruction from the user for reproducing the image, and that the display control unit allow the user to recognize, through the head-mounted display, an augmented reality space obtained by merging a real space with a virtual space, and cause the image to be reproduced and displayed on an actual object in the real space in response to the reproduction instruction.

A control apparatus for a head-mounted display according to an aspect of the present invention is a control apparatus for a head-mounted display that is worn on a head of a user, including: a display control unit that causes a list in which a plurality of images are arranged to be displayed on the head-mounted display; an information accepting unit that accepts information about an eye fixation duration of the user for an image among the plurality of images, the eye fixation duration being measured by a time measurement unit on the basis of a result of detection by a detection unit, the detection unit detecting an eye gaze of the user directed at the image; and an information management unit that records the image and the information about the eye fixation duration to a storage unit in association with each other.

An operation method for a control apparatus for a head-mounted display according to an aspect of the present invention is an operation method for a control apparatus for a head-mounted display that is worn on a head of a user, including: a display control step of causing a list in which a plurality of images are arranged to be displayed on the head-mounted display; an information accepting step of accepting information about an eye fixation duration of the user for an image among the plurality of images, the eye fixation duration being measured by a time measurement unit on the basis of a result of detection by a detection unit, the detection unit detecting an eye gaze of the user directed at the image; and an information management step of recording the image and the information about the eye fixation duration to a storage unit in association with each other.

According to the present invention, the eye fixation duration of a user for an image in a list displayed on the head-mounted display is measured, and the image and information about the eye fixation duration are recorded in association with each other. Accordingly, it is possible to provide an image display system, and a control apparatus for a head-mounted display and an operation method therefor with which information about the eye fixation duration for an image can be effectively used.

BRIEF DESCRIPTION OF THE DRAWINGS

FIG. 8 is a diagram illustrating evaluation criteria;
FIG. 9 is a diagram illustrating image interest-level information;
FIG. 10 is a diagram illustrating a selection condition.

DESCRIPTION OF THE PREFERRED EMBODIMENTS

First Embodiment

Figure 1:
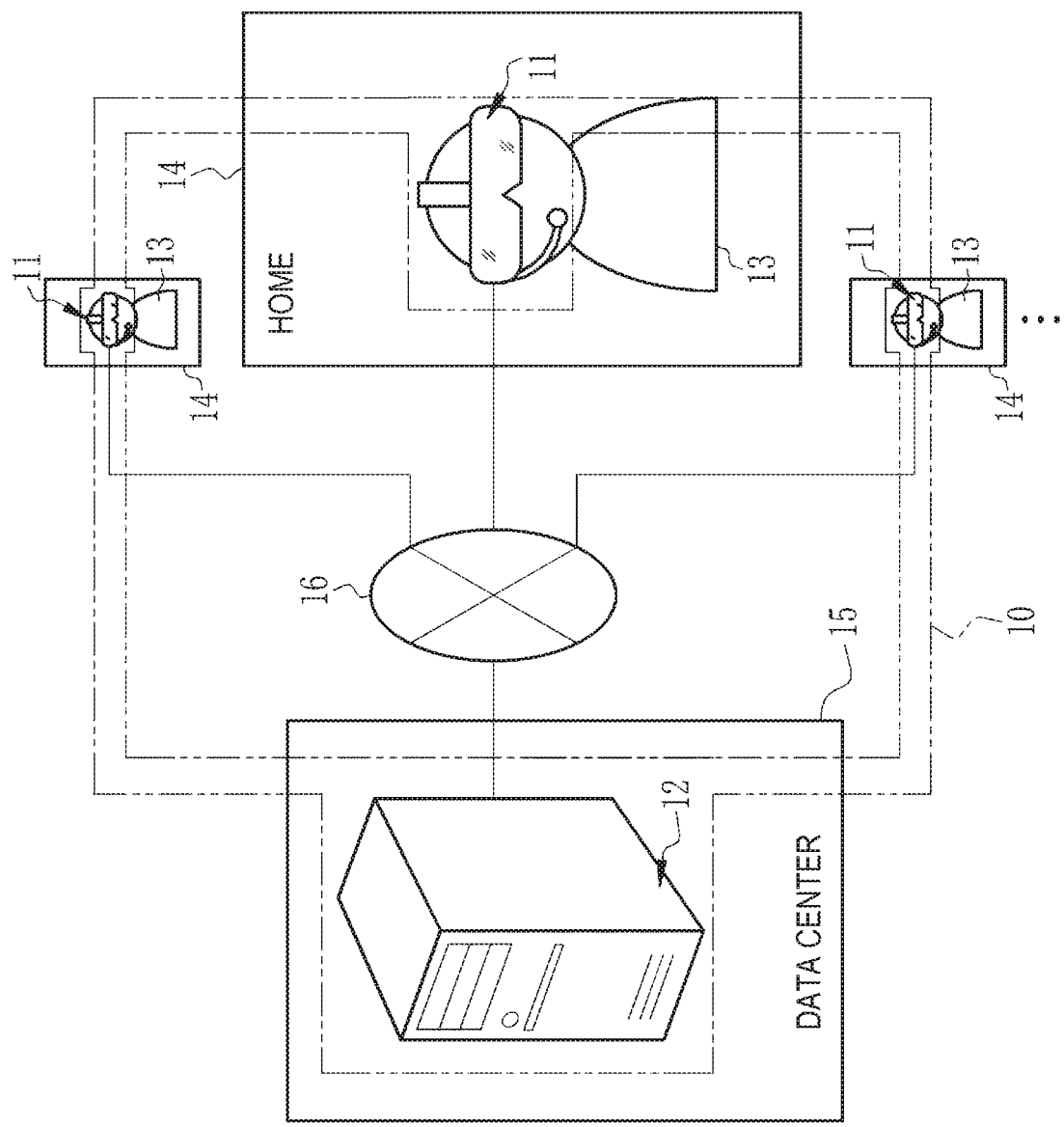
FIG. 1 is a diagram illustrating an image display system.

In FIG. 1, an image display system 10 includes HMDs 11 and a control server 12 that corresponds to a control apparatus for the HMDs 11. The image display system 10 is a system in which images accumulated on the control server 12 are displayed on the HMDs 11 and users 13 browse the images through the respective HMDs 11. The HMDs 11 are used in homes 14 of the respective users 13. The HMDs 11 are worn by the respective users 13 on their head. Here, the head is a part of the human body that is located above the neck of the human body in a standing position state, and is a part that includes the face and so on. The control server 12 is placed in a data center 15.

The HMDs 11 are connected to the control server 12 via a network 16 so as to allow communication with each other. The network 16 is, for example, a WAN (wide area network), such as the Internet or a public communication network. On the network 16, a VPN (virtual private network) is formed or a communication protocol having a high security level, such as HTTPS (Hypertext Transfer Protocol Secure), is used by taking into consideration information security.

The control server 12 has a function of receiving and accumulating images from image capturing devices, personal computers, or the like (not illustrated) of the users 13 and distributing the images to the HMDs 11. The images include images captured by the users 13 using the image capturing devices, images downloaded by the users 13 from the Internet, and so on. An image can be retrieved by using, for example, a user ID (identification data), which is an ID for identifying each user 13, an image ID, which is an ID for identifying each image, the image capture date and time or the image obtaining date and time, the image capture location (GPS (global positioning system) information) or the image obtaining location on the Internet (URL (uniform resource locator)), or a keyword given by the user 13 as a search key. Hereinafter, the images accumulated on the control server 12 are referred to as accumulation images 43 (see FIG. 3).

In the control server 12, the accumulation images 43 from the plurality of users 13 are collected and managed. The control server 12 searches for the accumulation images 43 that correspond to a distribution instruction from one of the HMDs 11 and distributes the retrieved accumulation images 43 to the HMD 11 that has given the distribution instruction.

The control server 12 also has functions of controlling operations of the HMDs 11. Specifically, the control server 12 has a function of causing various screens including an accumulation image list screen 45 (see FIG. 3) having a list 44 (see FIG. 3) of the accumulation images 43 to be displayed on the HMDs 11, a function of creating an electronic album 61 (see FIG. 6) constituted by a group of some of the plurality of accumulation images 43, and so on.

In FIG. 1, the control server 12 is connected to the plurality of HMDs 11 that are respectively worn by the plurality of users 13, via the network 16. The control server 12 controls operations of each of the plurality of HMDs 11 in an independent manner.

Figure 2:
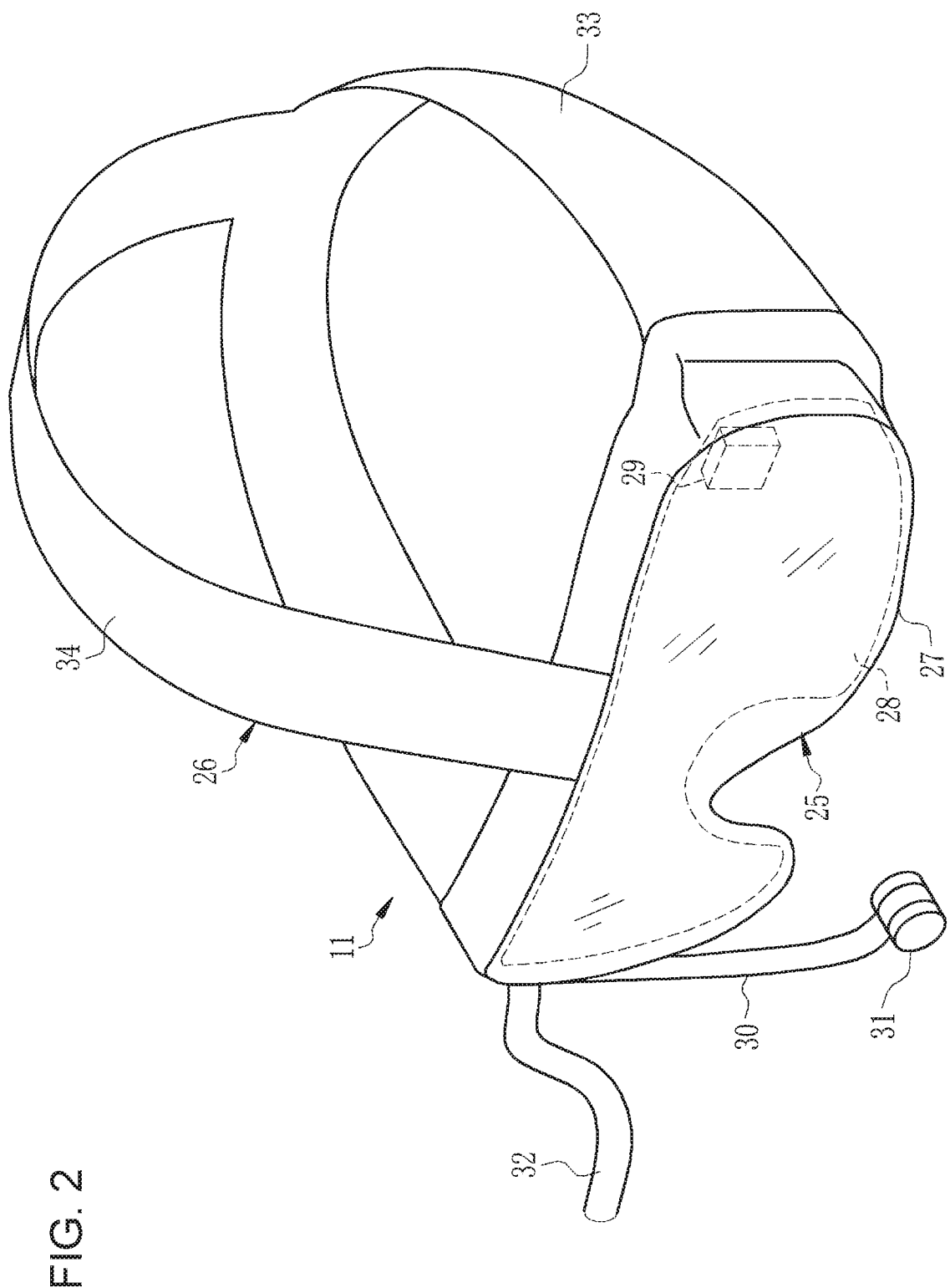
FIG. 2 is a perspective external view of a head-mounted display.

In FIG. 2, the HMD 11 is constituted by a main body part 25 and a band part 26. The main body part 25 is located in front of the eyes of the user 13 when the user 13 is wearing the HMD 11. The band part 26 is fixed to the upper half of the head of the user 13 when the user 13 is wearing the HMD 11.

The main body part 25 includes a protective frame 27, a screen 28, and an eye gaze detection camera 29. The protective frame 27 has a goggle form to entirely cover the both eyes of the user 13 and is formed of transparent colored glass or plastic. Although not illustrated, polyurethane foam is attached to a part of the protective frame 27 that is in contact with the face of the user 13.

The screen 28 and the eye gaze detection camera 29 are disposed on the inner side of the protective frame 27. The screen 28 has an eyeglasses form and is formed of a transparent material similarly to the protective frame 27. The user 13 visually recognizes a real space RS (see FIG. 4) with the naked eyes through the screen 28 and the protective frame 27. That is, the HMD 11 is of a transparent type.

On the inside surface of the screen 28 that faces the eyes of the user 13, a virtual image formed by using computer graphics is projected and displayed by a projection part (not illustrated). As is well known, the projection part is constituted by a display element, such as a liquid crystal, for displaying a virtual image and a projection optical system that projects the virtual image displayed on the display element onto the inside surface of the screen 28. The virtual image is reflected by the inside surface of the screen 28 and is visible to the user 13. Accordingly, the user 13 recognizes the virtual image as a virtual image in a virtual space VS (see FIG. 4).

The virtual image includes a virtual object that is recognized by the user 13 in an augmented reality space ARS (see FIG. 3) similarly to an actual object that is present in the real space RS. The virtual object is, for example, the accumulation image list screen 45.

The eye gaze detection camera 29 is provided, for example, at the left end of the upper part of the main body part 25 that faces the outer end of the left eyebrow of the user 13 when the user 13 is wearing the HMD 11. The eye gaze detection camera 29 is, for example, a visible-light camera and captures an image of the left eye of the user 13 at a predetermined frame rate (for example, 30 frames/second). The images (hereinafter referred to as "captured images") 85 (see FIG. 11) captured by the eye gaze detection camera 29 are successively transmitted to the control server 12.

To the main body part 25, an arm 30 is attached. To the distal end of the arm 30, a microphone 31 is attached. The length and orientation of the arm 30 can be changed, and the position of the microphone 31 can be adjusted accordingly. The microphone 31 collects spoken utterances of the user 13 for giving various instructions to the control server 12 and outputs the spoken utterances as electric signals. The instructions that are given to the control server 12 include a distribution instruction for the accumulation image list screen 45 (see FIG. 6 and FIG. 13), an album creation instruction for creating the electronic album 61 (see FIG. 6 and FIG. 15), and so on.

To the main body part 25, one end of a cable 32 is connected. The other end of the cable 32 is connected to a network device, such as a router. The HMD 11 communicates with the control server 12 via the cable 32. Note that communication performed by the HMD 11 need not be wired communication using the cable 32 and may be wireless communication.

The band part 26 is a belt-like strip having a width of approximately several centimeters and is constituted by a horizontal band 33 and a vertical band 34. The horizontal band 33 is wound so as to extend along the temples and the back of the head of the user 13. The vertical band 34 is wound so as to extend along the forehead, the parietal region of the head, and the back of the head of the user 13. To the horizontal band 33 and the vertical band 34, buckles not illustrated are attached so that the lengths are adjustable.

Figure 3:
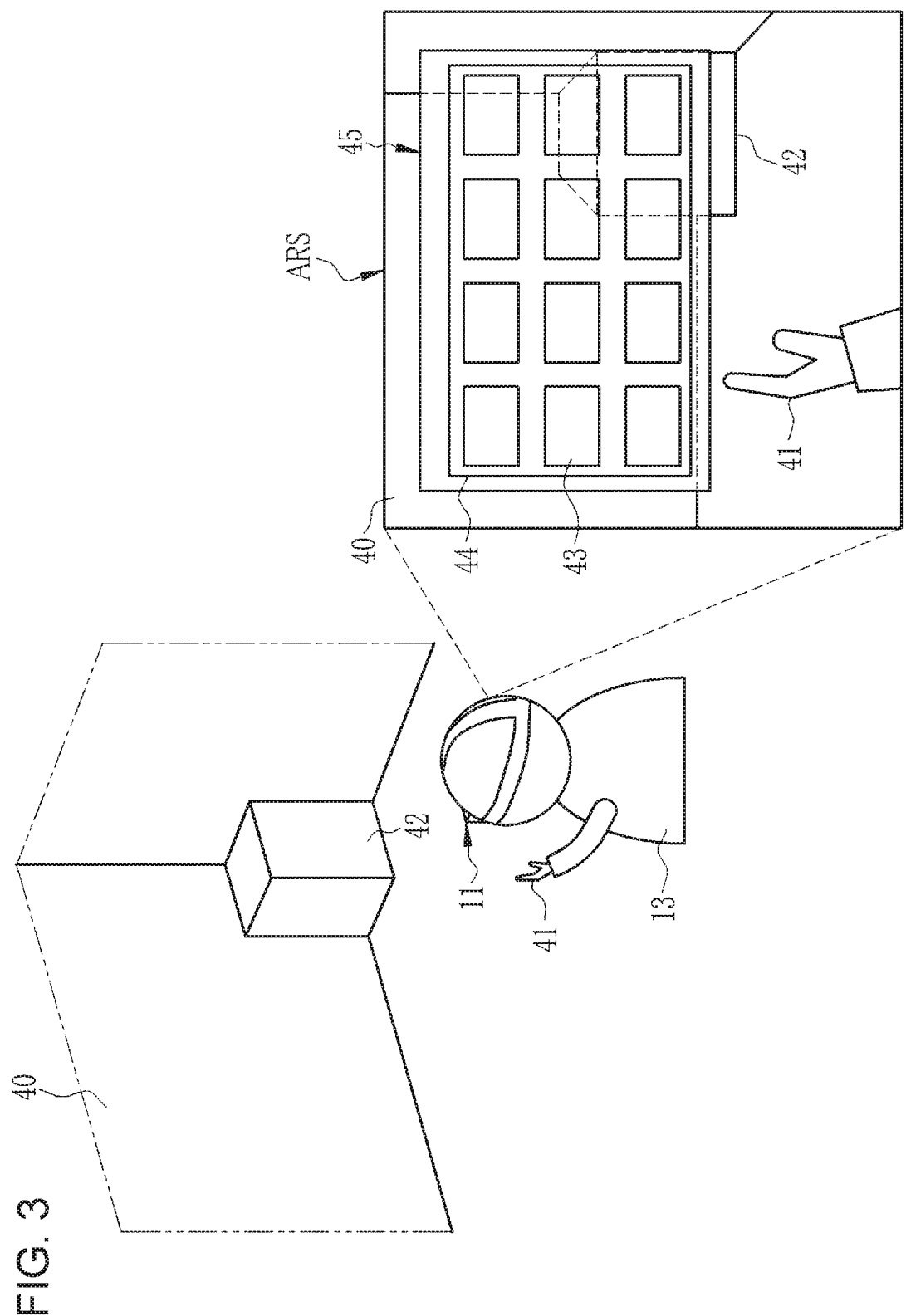
FIG. 3 is a diagram illustrating a state where a user is using the head-mounted display.

FIG. 3 is a diagram illustrating a state where the user 13 is using the HMD 11 in the home 14. The user 13 stands so as to face a wall 40 of the home 14 and puts a left hand 41 up. In the corner of the wall 40, a pedestal 42 is placed. Note that the cable 32 is omitted in FIG. 3.

The user 13 recognizes the augmented reality space ARS through the HMD 11. In the augmented reality space ARS, the accumulation image list screen 45 having the list 44 of the accumulation images 43 is displayed. The wall 40 and the pedestal 42 are mostly hidden behind the accumulation image list screen 45, as represented by a dashed line. On the other hand, the left hand 41 is not hidden behind the accumulation image list screen 45 and is located below the accumulation image list screen 45.

Figure 4:
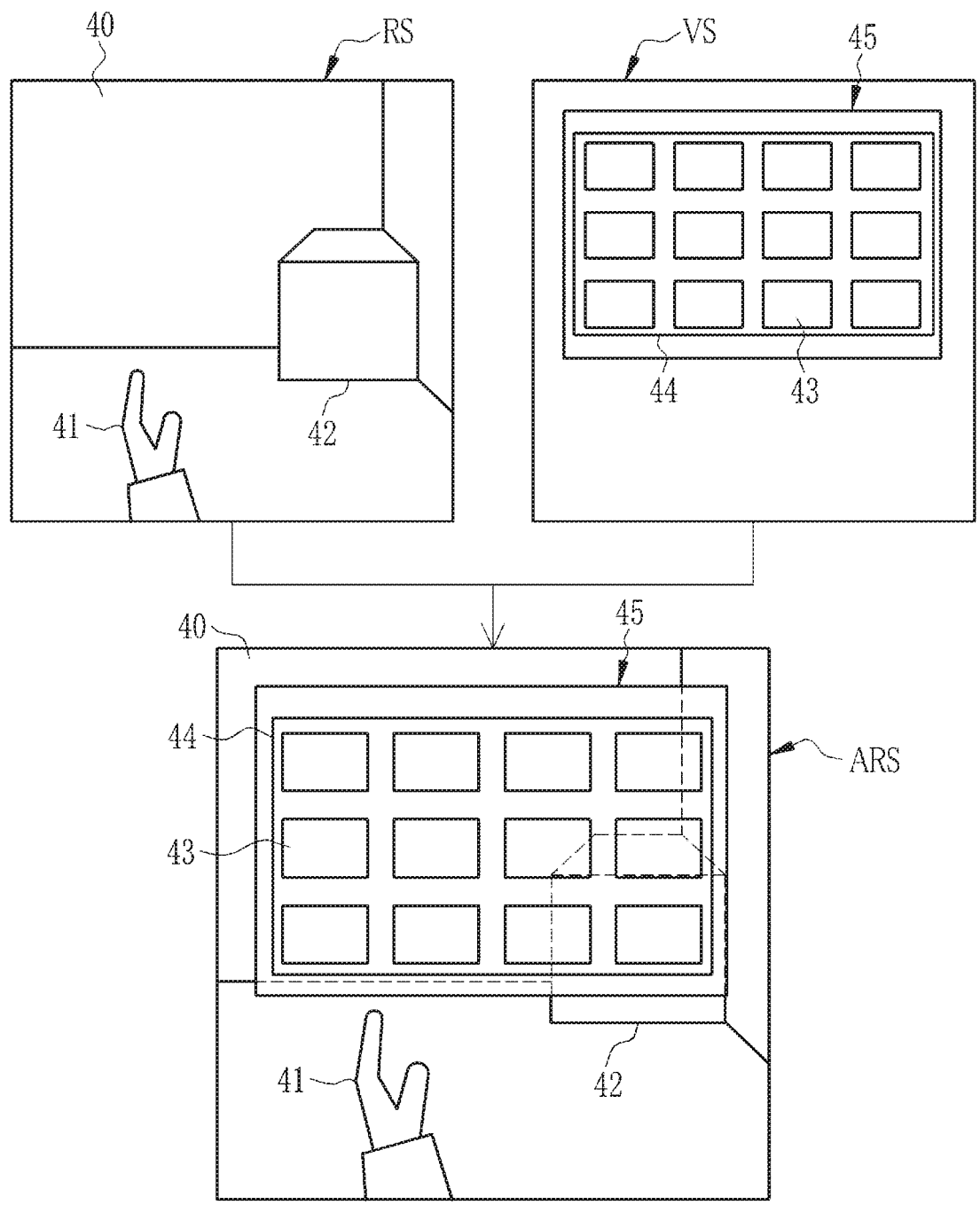
FIG. 4 is a diagram for describing the way in which an augmented reality space is organized.

FIG. 4 illustrates the way in which the augmented reality space ARS is organized. The user 13 visually recognizes, through the screen 28 and the protective frame 27 of the HMD 11, the real space RS in which the wall 40, the left hand 41, and the pedestal 42 are present. In addition, the user 13 visually recognizes, on the inside surface of the screen 28, the virtual space VS in which the accumulation image list screen 45 is present. Accordingly, the user 13 recognizes the augmented reality space ARS obtained by merging the real space RS with the virtual space VS.

The display position of the accumulation image list screen 45 is fixed to a predetermined position in the virtual space VS. Therefore, in the augmented reality space ARS, the accumulation image list screen 45 is always displayed at the same position and in the same size. Note that the display positions of various screens other than the accumulation image list screen 45 are similarly fixed to the predetermined position in the virtual space VS.

Figure 5:
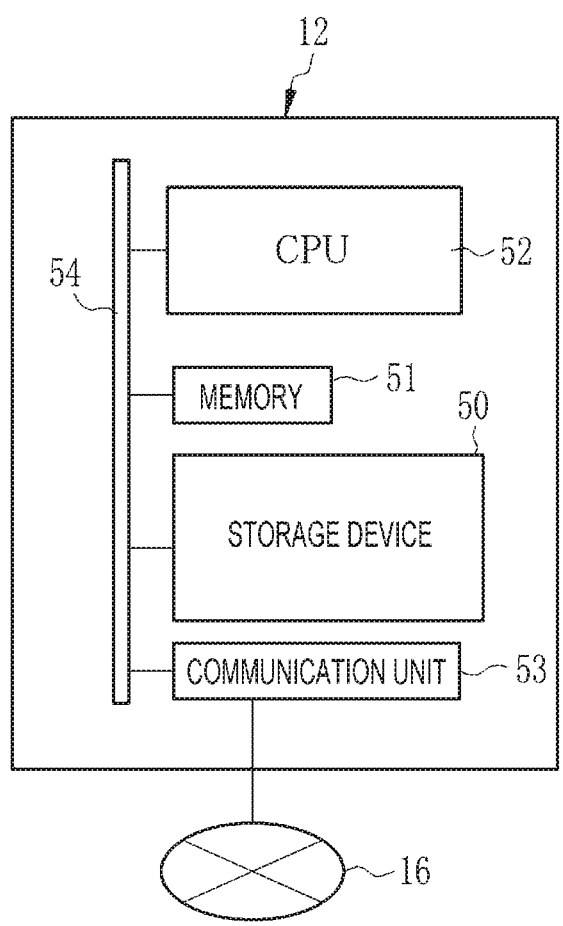
FIG. 5 is a block diagram illustrating a computer that constitutes a control server.

In FIG. 5, the control server 12 includes a storage device 50, a memory 51, a CPU (central processing unit) 52, and a communication unit 53. These are connected to one another via a data bus 54.

The storage device 50 is a hard disk drive or a disk array constituted by a plurality of hard disk drives, which is built in the control server 12 or is connected to the control server 12 via a cable or a network. In the storage device 50, a control program, such as an operating system, various application programs, various types of information associated with these programs, and so on are stored.

The memory 51 is a work memory used by the CPU 52 to perform processing. The CPU 52 loads a program stored in the storage device 50 to the memory 51 and performs processing in accordance with the program to thereby centrally control each unit of the control server 12. The communication unit 53 is responsible for communication of various types of information with the HMDs 11 via the network 16.

Figure 6:
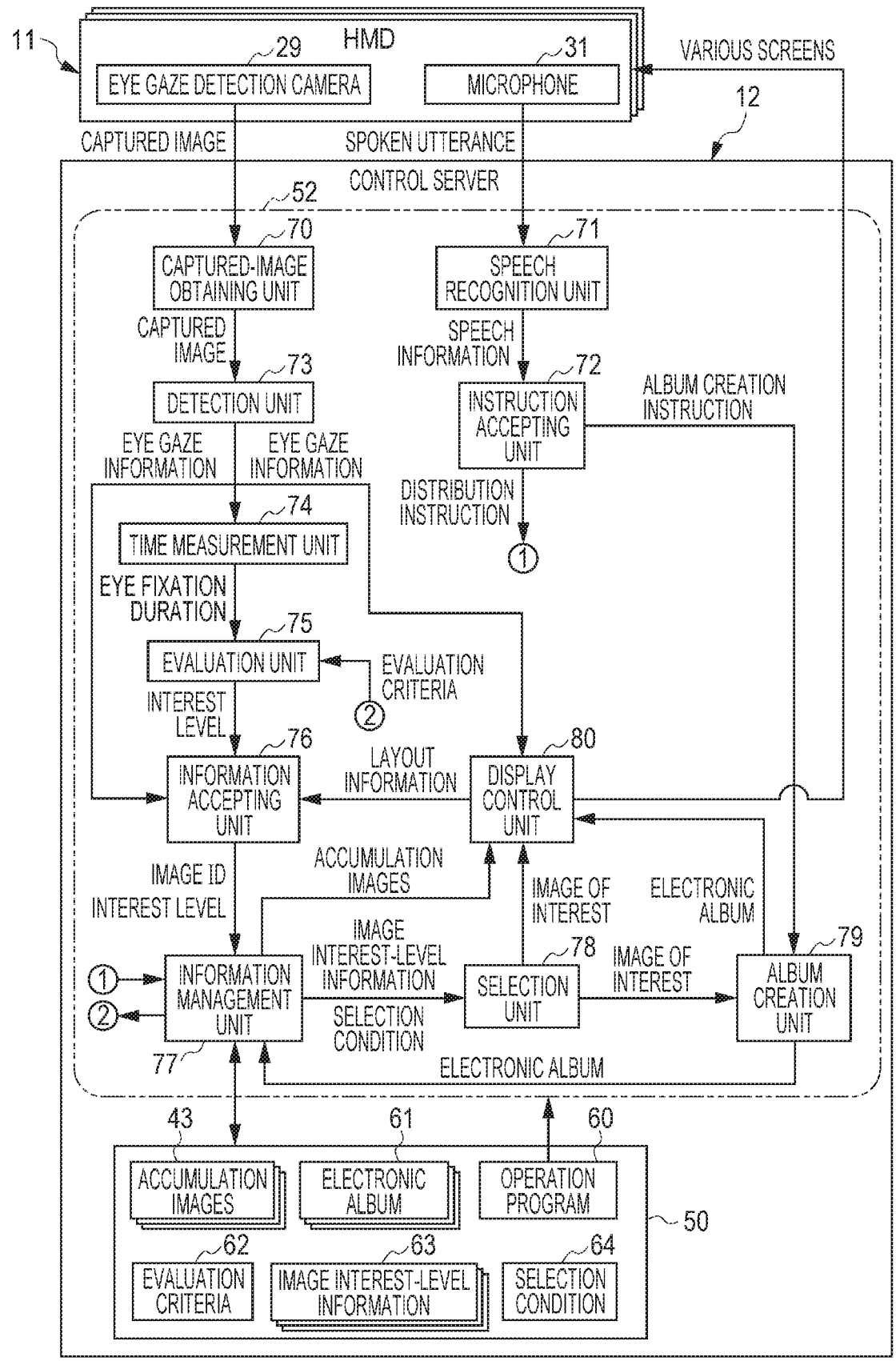
FIG. 6 is a block diagram illustrating a configuration of a CPU of the control server.

In FIG. 6, in the storage device 50, an operation program 60 is stored. The operation program 60 is an application program for causing a computer that constitutes the control server 12 to function as the control apparatus for the HMDs 11. In the storage device 50, the accumulation images 43, the electronic album 61, evaluation criteria 62, image interest-level information 63, and a selection condition 64 are stored in addition to the operation program 60. The accumulation images 43, the electronic album 61, and the image interest-level information 63 are stored for each user 13 and are distinguished by the user ID.

When the operation program 60 is activated, the CPU 52 works together with the memory 51 and so on to function as a captured-image obtaining unit 70, a speech recognition unit 71, an instruction accepting unit 72, a detection unit 73, a time measurement unit 74, an evaluation unit 75, an information accepting unit 76, an information management unit 77, a selection unit 78, an album creation unit 79, and a display control unit 80.

The captured-image obtaining unit 70 obtains the captured images 85 successively transmitted from the eye gaze detection camera 29 of the HMD 11 at a predetermined frame rate. The captured-image obtaining unit 70 outputs the obtained captured images 85 to the detection unit 73.

The speech recognition unit 71 recognizes, on the basis of an electric signal of a spoken utterance of the user 13 from the microphone 31 of the HMD 11, the content of the spoken utterance. The speech recognition unit 71 outputs speech information, which is the result of recognizing the content of the spoken utterance, to the instruction accepting unit 72.

The instruction accepting unit 72 accepts various instructions represented by the speech information from the speech recognition unit 71. In a case where an accepted instruction is the distribution instruction for the accumulation image list screen 45, the instruction accepting unit 72 outputs the accepted instruction to the information management unit 77. In a case where an accepted instruction is the album creation instruction for crating the electronic album 61, the instruction accepting unit 72 outputs the accepted instruction to the album creation unit 79. The instructions accepted by the instruction accepting unit 72 include not only the distribution instruction and the album creation instruction but also a reproduction instruction for reproducing the accumulation image 43 (see FIG. 14), an end instruction for ending display of the accumulation image list screen 45 (see FIG. 16), a saving instruction for saving the electronic album 61 (see FIG. 17), and so on.

The detection unit 73 detects the eye gaze of the user 13 directed at one of the accumulation images 43 in the list 44 on the basis of the captured image 85 from the captured-image obtaining unit 70. The detection unit 73 outputs eye gaze information, which is the result of detecting the eye gaze, to the time measurement unit 74, the information accepting unit 76, and the display control unit 80.

The time measurement unit 74 measures the eye fixation duration of the user 13 for the accumulation image 43 in the list 44. The time measurement unit 74 outputs the measured eye fixation duration to the evaluation unit 75.

The evaluation unit 75 replaces the eye fixation duration from the time measurement unit 74 with an interest level of the user 13 for the accumulation image 43 on the basis of the evaluation criteria 62. The evaluation unit 75 outputs, to the information accepting unit 76, the interest level obtained as a result of replacement as information about the eye fixation duration.

The information accepting unit 76 is responsible for an information accepting function of accepting the eye gaze information from the detection unit 73 and the interest level from the evaluation unit 75. Further, the information accepting unit 76 accepts, from the display control unit 80, layout information (see FIG. 12) indicating the arrangement of the plurality of accumulation images 43 in the list 44. The information accepting unit 76 converts the eye gaze information from the detection unit 73 to the image ID of the accumulation image 43 on the basis of the layout information from the display control unit 80. The information accepting unit 76 outputs the image ID obtained as a result of conversion and the interest level from the evaluation unit 75 to the information management unit 77.

The information management unit 77 is responsible for an information management function of managing various types of information stored in the storage device 50. As part of the information management function, the information management unit 77 records the image ID and the interest level from the information accepting unit 76 to the storage device 50 in association with each other as the image interest-level information 63. That is, the storage device 50 corresponds to a storage unit.

The information management unit 77 reads the image interest-level information 63 from the storage device 50 and passes the read image interest-level information 63 to the selection unit 78 together with the selection condition 64.

The information management unit 77 reads the accumulation images 43 from the storage device 50 in response to a distribution instruction for the accumulation image list screen 45 from the instruction accepting unit 72. Then, the information management unit 77 passes the read accumulation images 43 to the display control unit 80. Further, the information management unit 77 passes the evaluation criteria 62 to the evaluation unit 75.

The information management unit 77 receives the electronic album 61 from the album creation unit 79 and stores the electronic album 61 in the storage device 50. Further, the information management unit 77 stores, in the storage device 50, the accumulation images 43 obtained by an accumulation image obtaining unit (not illustrated) from an image capturing device, a personal computer, or the like of the user 13. The information management unit 77 stores the accumulation images 43 in folders 90 (see FIG. 13) in accordance with, for example, the image capture date and time or the image obtaining date and time.

The selection unit 78 selects at least one image of interest 100 (see FIG. 15) from the plurality of accumulation images 43 in the list 44 in accordance with the image interest-level information 63 and the selection condition 64 from the information management unit 77. The selection unit 78 outputs the selected image of interest 100 to the album creation unit 79 and the display control unit 80.

The album creation unit 79 creates the electronic album 61 that is constituted by a group of some of the plurality of accumulation images 43. In a case where the image of interest 100 is selected by the selection unit 78 and an album creation instruction is received from the instruction accepting unit 72, the album creation unit 79 creates the electronic album 61 that includes the image of interest 100. The album creation unit 79 outputs the created electronic album 61 to the information management unit 77 and the display control unit 80.

The display control unit 80 is responsible for a display control function of causing various screens including the accumulation image list screen 45 to be displayed on the HMD 11. For example, the display control unit 80 generates the accumulation image list screen 45 on the basis of the accumulation images 43 from the information management unit 77 in accordance with the layout information. The display control unit 80 outputs the generated accumulation image list screen 45 to the HMD 11 that has given the distribution instruction. Further, the display control unit 80 outputs the layout information to the information accepting unit 76. Note that the layout information is stored in the storage device 50 similarly to the evaluation criteria 62 and so on.

The captured-image obtaining unit 70, the speech recognition unit 71, the instruction accepting unit 72, the detection unit 73, the time measurement unit 74, the evaluation unit 75, the information accepting unit 76, the information management unit 77, the selection unit 78, the album creation unit 79, and the display control unit 80 described above control the plurality of HMDs 11 that are respectively worn by the plurality of users 13 in an independent manner. For example, the captured-image obtaining unit 70 obtains captured images from the plurality of HMDs 11 that are respectively worn by the plurality of users 13. The display control unit 80 generates an accumulation image list screen 45A that corresponds to an HMD 11A worn by a user 13A and an accumulation image list screen 45B that corresponds to an HMD 11B worn by a user 13B, as illustrated in, for example, FIG. 7. Then, the display control unit 80 causes the accumulation image list screen 45A to be displayed on the HMD 11A and causes the accumulation image list screen 45B to be displayed on the HMD 11B. Accumulation images 43A in a list 44A on the accumulation image list screen 45A are images owned by the user 13A, and accumulation images 43B in a list 44B on the accumulation image list screen 45B are images owned by the user 13B and different from those owned by the user 13A.

In FIG. 8, the evaluation criteria 62 indicate correspondences between the eye fixation duration and the interest level. An eye fixation duration of 0 second corresponds to a case where the eye gaze of the user 13 is never directed, and the lowest interest level of 1 is made to correspond thereto. Subsequently, to an eye fixation duration of 1 second or more and less than 10 seconds, an interest level of 2 is made to correspond. To an eye fixation duration of 10 seconds or more and less than 20 seconds, an interest level of 3 is made to correspond. To an eye fixation duration of 20 seconds or more and less than 30 seconds, an interest level of 4 is made to correspond. To an eye fixation duration of 30 seconds or more, the highest interest level of 5 is made to correspond. The evaluation unit 75 replaces the eye fixation duration with the interest level in accordance with the evaluation criteria 62. For example, in a case where the eye fixation duration from the time measurement unit 74 is 8 seconds, the evaluation unit 75 outputs the interest level of 2 to the information accepting unit 76.

In FIG. 9, as the image interest-level information 63, the image ID of each of the accumulation images 43 and a corresponding interest level, which corresponds to the information about the eye fixation duration, are recorded in association with each other. FIG. 9 illustrates the image interest-level information 63 about the user 13 having a user ID "U001". For example, the interest level of 5 is associated with an image ID "P003", and the interest level of 1 is associated with an image ID "P004". The image interest-level information 63 can be used to know the interest level of the user 13 for each of the plurality of accumulation images 43.

In FIG. 10, as the selection condition 64, for example, "the interest level of 4 or higher" is registered. That is, the selection condition 64 indicates that the accumulation image 43 for which the interest level is 4 or higher is to be selected as the image of interest 100. Therefore, in a case where the image interest-level information 63 includes content as illustrated by the example in FIG. 9, the selection unit 78 selects at least the accumulation images 43 respectively having the image IDs "P003" and "P005" for which the interest level is 4 or higher as the images of interest 100. Note that, in a case where none of the accumulation images 43 satisfy the selection condition 64, the selection unit 78 does not make selection of the image of interest 100, as a matter of course.

Figure 11:
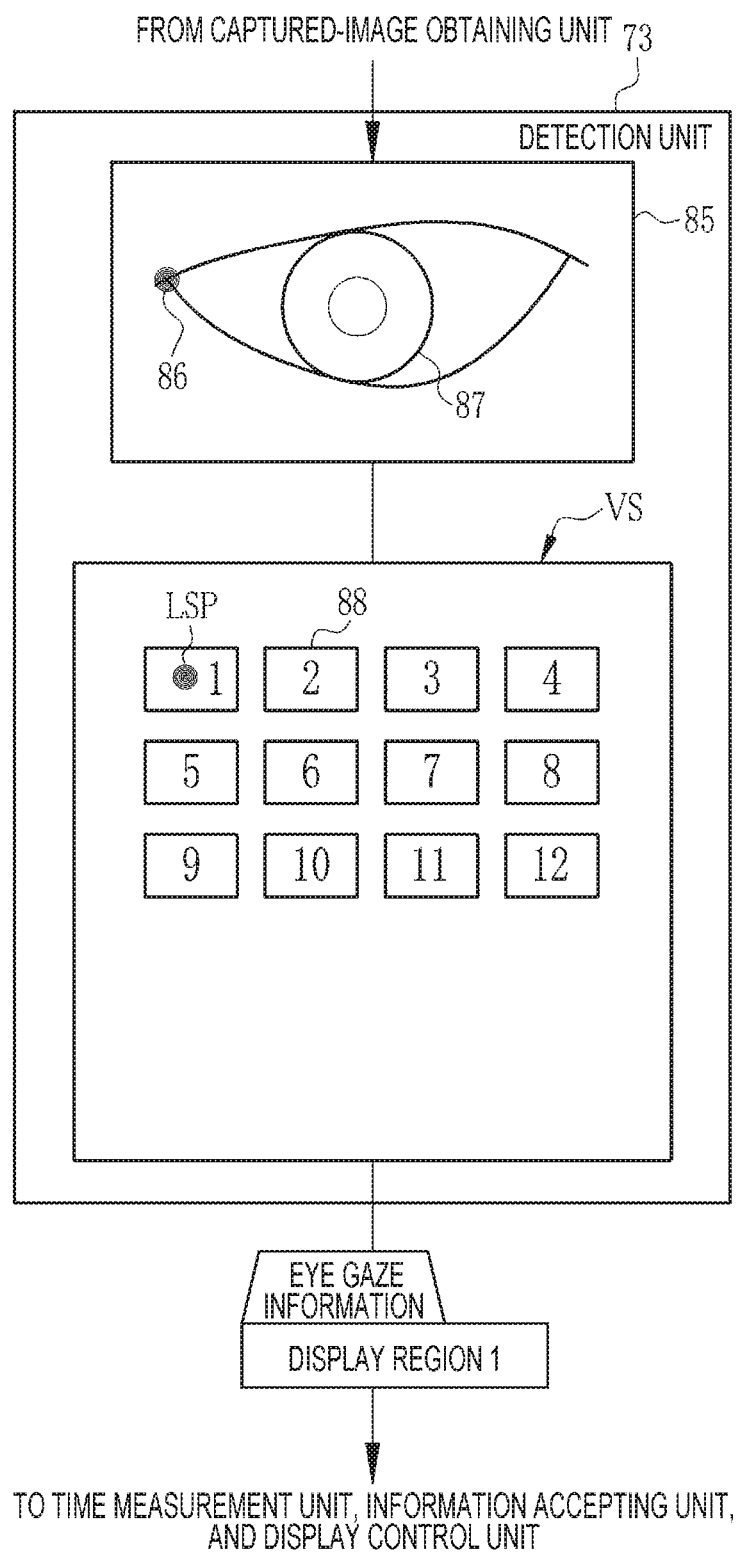
FIG. 11 is a diagram illustrating a function of a detection unit.

In FIG. 11, the detection unit 73 analyzes the captured image 85 from the captured-image obtaining unit 70 and recognizes the position of an inner corner 86 and an iris 87 of the left eye of the user 13. Then, on the basis of the position of the iris 87, which is a moving point, relative to the inner corner 86, which is a reference point, the detection unit 73 detects a display region 88 in which the eye gaze point LSP of the user 13 is located among the display regions 88 of the plurality of accumulation images 43 in the list 44 in the virtual space VS. Each of the display regions 88 is assigned a number for distinguishing the display region 88. The detection unit 73 outputs the number of the display region 88 in which the eye gaze point LSP of the user 13 is determined to be located as eye gaze information. FIG. 11 illustrates a case where the detection unit 73 determines that the eye gaze point LSP is located in the display region 88 having number 1.

During a period in which the eye gaze information indicating the same display region 88 is input from the detection unit 73, the time measurement unit 74 measures the eye fixation duration for the display region 88. For example, during a period in which the eye gaze point LSP is located in the display region 88 having number 1, the time measurement unit 74 measures the eye fixation duration for the display region 88 having number 1. Then, in a case where the eye gaze point LSP moves from the display region 88 having number 1 to, for example, the display region 88 having number 2, the time measurement unit 74 stops measuring the eye fixation duration for the display region 88 having number 1 and starts measuring the eye fixation duration for the display region 88 having number 2.

During a period in which the accumulation image list screen 45 remains displayed, even if the eye gaze point LSP shifts from one of the display region 88 and returns again to the display region 88, the time measurement unit 74 measures the eye fixation duration for the display region 88. Therefore, the eye fixation duration is an accumulated duration in which the eye gaze point LSP is located in the display region 88 while the accumulation image list screen 45 remains displayed. In the case where the eye gaze point LSP returns again, it may be determined that the interest level of the user 13 is high, and the eye fixation duration may be weighted and, for example, multiplied by a factor of 1.5. Note that, in a case where the eye gaze information indicates a position other than the display regions 88, the time measurement unit 74 does not measure the eye fixation duration.

Figure 12:
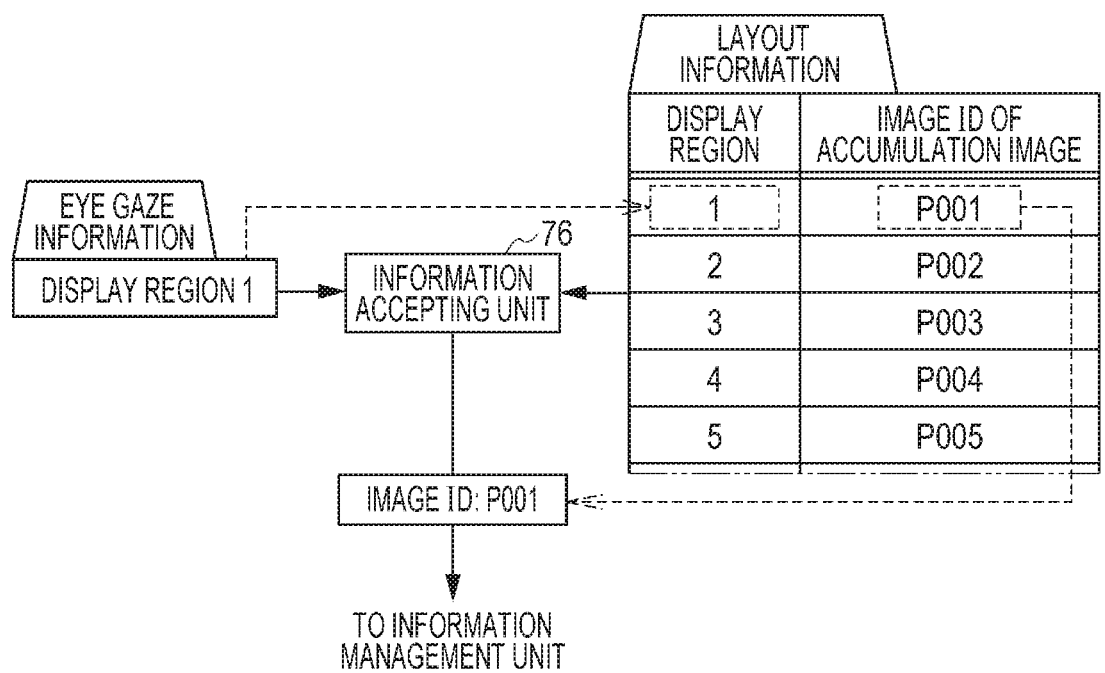
FIG. 12 is a diagram illustrating a function of an information accepting unit.

In FIG. 12, the layout information output from the display control unit 80 to the information accepting unit 76 includes the image IDs of the accumulation images 43 displayed in the respective display regions 88. The information accepting unit 76 uses the layout information to obtain the image ID of the accumulation image 43 that corresponds to the display region 88 indicated by the eye gaze information from the detection unit 73. Then, the information accepting unit 76 outputs the obtained image ID to the information management unit 77. FIG. 12 illustrates a case where the display region 88 indicated by the eye gaze information has number 1, and the information accepting unit 76 outputs an image ID "P001", which is the image ID of the accumulation image 43 that corresponds to the display region 88 having number 1.

The user 13 is granted the right to access the control server 12. The display control unit 80 first causes an access authentication screen for access to the control server 12 to be displayed on the HMD 11. On the access authentication screen, a message asking the user ID and password is displayed. The user 13 speaks the user ID and password thereof. The microphone 31 converts the spoken utterance to an electric signal, the speech recognition unit 71 recognizes the content, and the instruction accepting unit 72 accepts the content as speech information. Then, an authentication unit not illustrated compares the user ID and password in the spoken utterance with a user ID and password registered in advance to perform access authentication.

Figure 13:
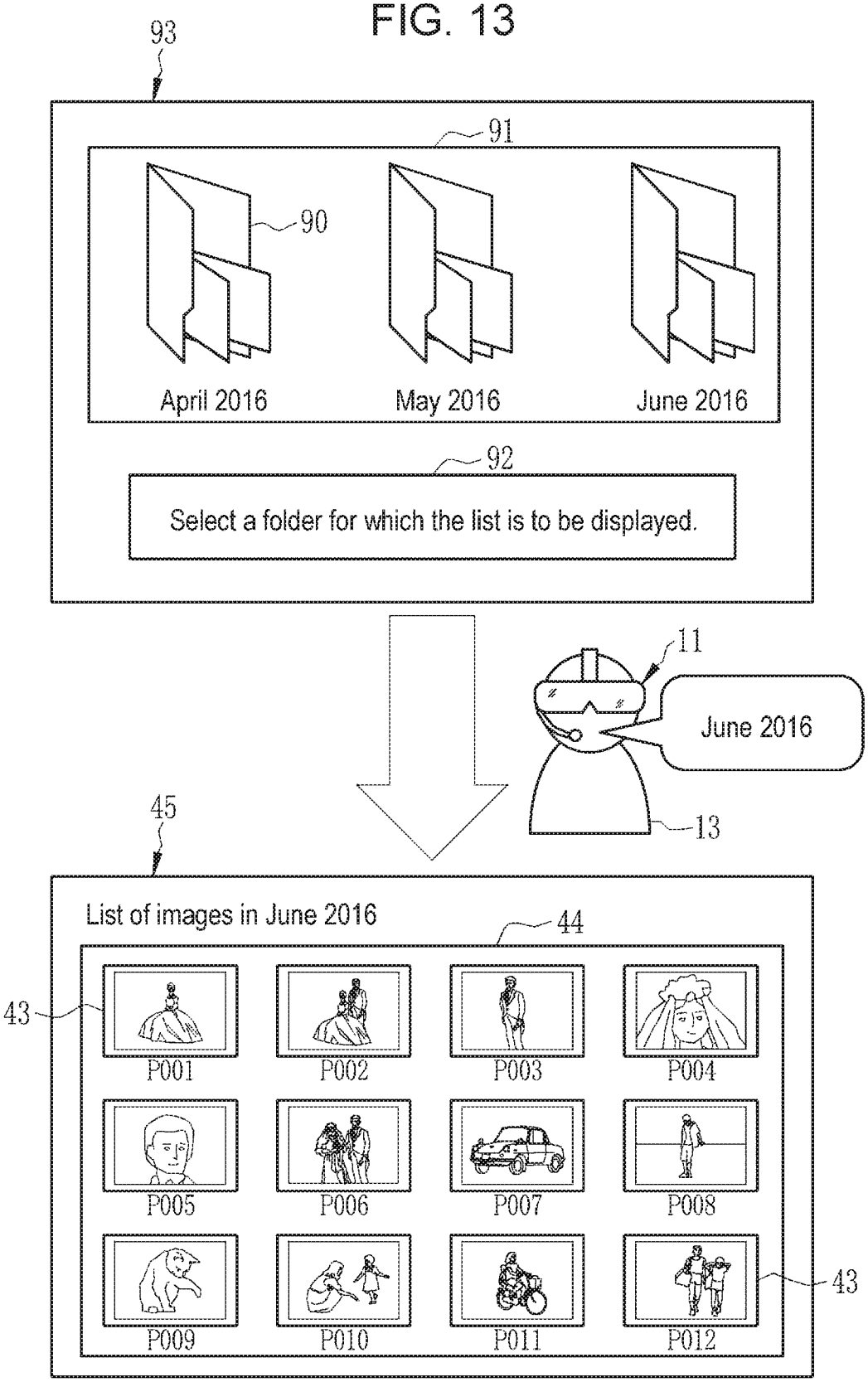
FIG. 13 is a diagram illustrating a display transition from a folder selection screen to an accumulation image list screen.

After access authentication, the display control unit 80 causes a folder selection screen 93 having a list 91 of the folders 90 for the accumulation images 43 and a message 92 to be displayed on the HMD 11, the message 92 prompting the user 13 to make a selection from the folders 90, as illustrated in the illustration above the arrow in FIG. 13. The user 13 speaks the name of the folder 90 for which the user 13 wants to display the list 44. The spoken utterance including the name of the folder 90 is recognized by the speech recognition unit 71 as speech information, and the speech information is accepted by the instruction accepting unit 72 as a distribution instruction for the accumulation image list screen 45. The display control unit 80 generates the accumulation image list screen 45 as illustrated in the illustration below the arrow in response to the distribution instruction and causes the accumulation image list screen 45 to be displayed on the HMD 11 that has given the distribution instruction. FIG. 13 illustrates a case where a distribution instruction for the accumulation image list screen 45 for the accumulation images 43 in the folder 90 named "June 2016" is given.

Figure 14:
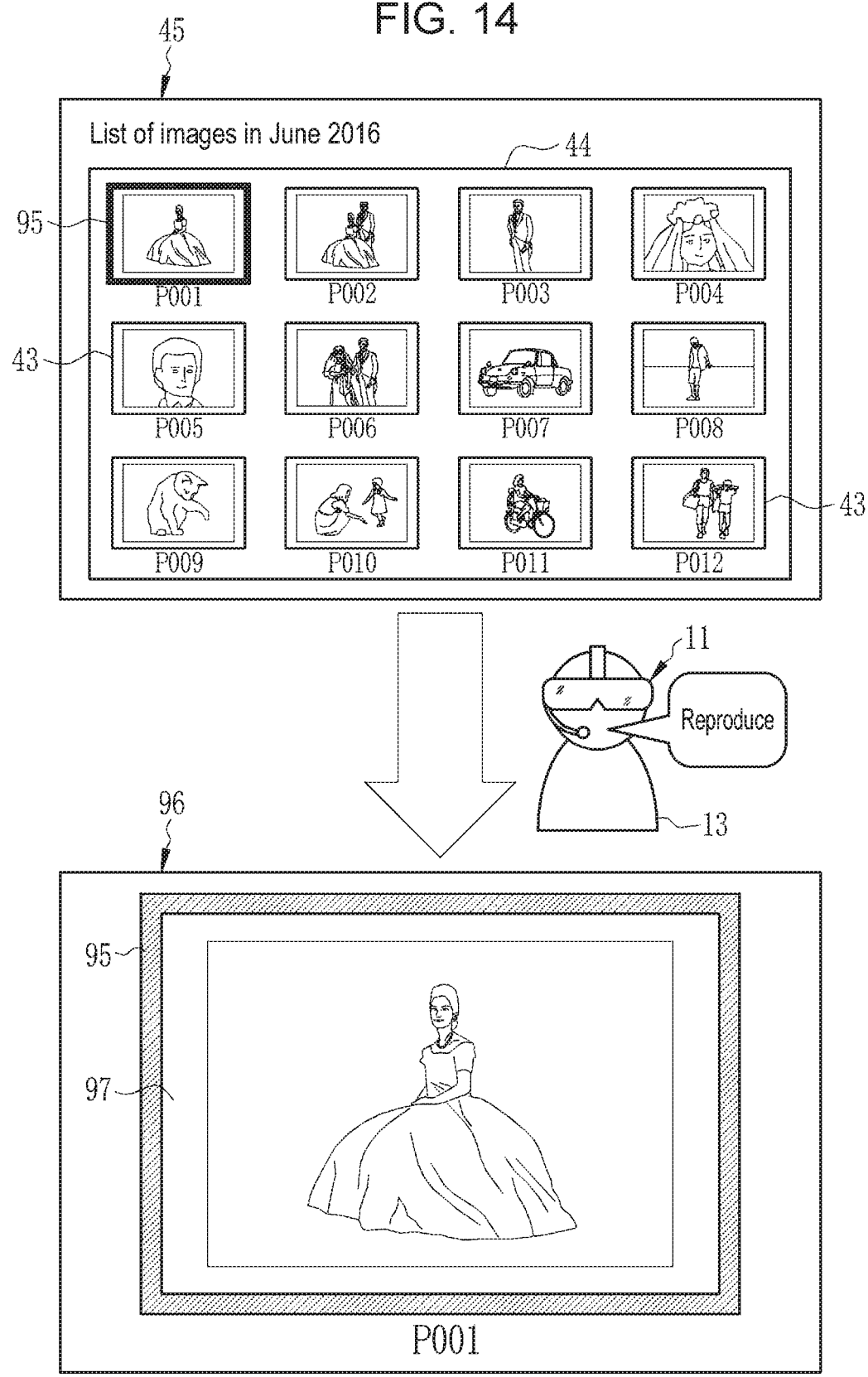
FIG. 14 is a diagram illustrating a display transition from the accumulation image list screen in a state where a mark is displayed on an accumulation image in a list at which the eye gaze of a user is directed to a reproduction display screen.

As illustrated in the illustration above the arrow in FIG. 14, the display control unit 80 causes a mark 95 to be displayed on the accumulation image 43 in the list 44 at which the eye gaze of the user 13 is directed, on the basis of the eye gaze information from the detection unit 73. The mark 95 is a rectangular frame that outlines the accumulation image 43 at which the eye gaze of the user 13 is directed (the display region 88 indicated by the eye gaze information). FIG. 14 illustrates a state where the display region 88 having number 1 is indicated by the eye gaze information and the mark 95 is displayed on the accumulation image 43 having the image ID "P001".

In a case where the user 13 says "reproduce" in the state where the mark 95 is displayed, the spoken utterance including the word "reproduce" is recognized by the speech recognition unit 71 as speech information, and the speech information is accepted by the instruction accepting unit 72 as a reproduction instruction. That is, the instruction accepting unit 72 functions as a reproduction instruction accepting unit. The display control unit 80 causes a reproduction display screen 96 for the accumulation image 43 on which the mark 95 is displayed to be displayed on the HMD 11, as illustrated in the illustration below the arrow. On the reproduction display screen 96, an enlarged image 97 is displayed, the enlarged image 97 being a full-sized image of the accumulation image 43 on which the mark 95 is displayed.

Figure 15:
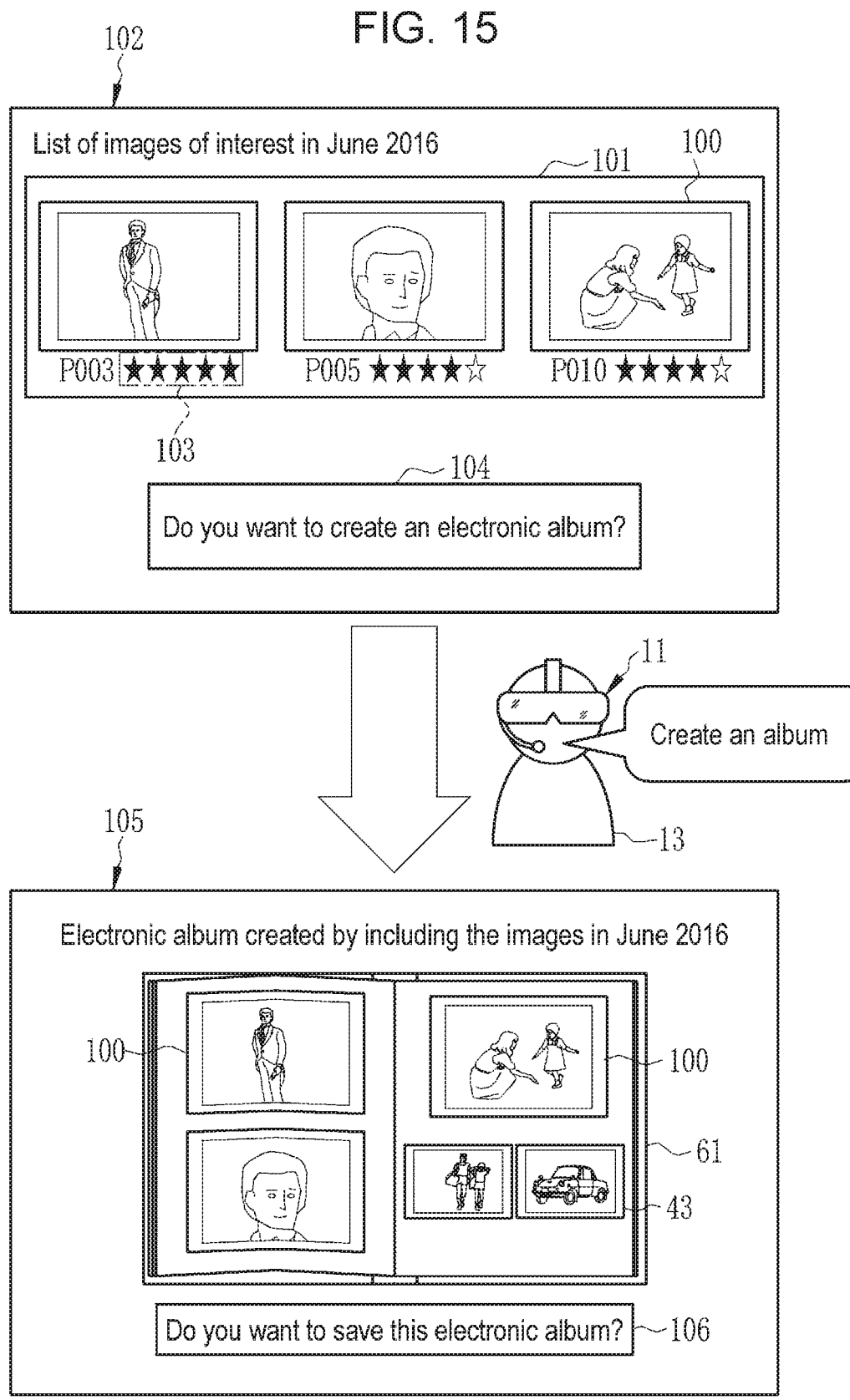
FIG. 15 is a diagram illustrating a display transition from an image-of-interest list screen to a browse screen for an electronic album.

After the end of display of the accumulation image list screen 45, the display control unit 80 causes an image-of-interest list screen 102 to be displayed on the HMD 11, as illustrated in the illustration above the arrow in FIG. 15, the image-of-interest list screen 102 having a list 101 of the images of interest 100 selected by the selection unit 78. Below each of the images of interest 100, stars 103 indicating the interest level of the user 13 for the image of interest 100 are displayed. Below the list 101, a message 104 asking whether the electronic album 61 is to be created is displayed. FIG. 15 illustrates a case where the accumulation images 43 respectively having the image IDs "P003", "P005", and "P010" are selected as the images of interest 100.

In a case where the user 13 says "create an album" in the state where the image-of-interest list screen 102 is displayed, the spoken utterance including the words "create an album" is recognized by the speech recognition unit 71 as speech information, and the speech information is accepted by the instruction accepting unit 72 as an album creation instruction. The album creation unit 79 creates the electronic album 61 that includes the images of interest 100 displayed on the image-of-interest list screen 102.

The display control unit 80 receives the electronic album 61 from the album creation unit 79 and causes a browse screen 105 for the electronic album 61 to be displayed on the HMD 11, as illustrated in the illustration below the arrow. The display control unit 80 causes the electronic album 61 to be displayed in a form similar to the form of a paper album.

FIG. 15 illustrates, for example, the electronic album 61 in which the images of interest 100 having a large size and the accumulation images 43 having a small size are mixed. Note that the electronic album 61 may be created by including only the images of interest 100, and briefly speaking, at least one image of interest 100 needs to be included in the electronic album 61. The album creation unit 79 may automatically create the electronic album 61 including the images of interest 100 after the end of display of the accumulation image list screen 45 without accepting an album creation instruction.

Below the electronic album 61, a message 106 asking whether the electronic album 61 is to be saved is displayed. In a case where, for example, the user 13 says "save the album" to the browse screen 105, the spoken utterance including the words "save the album" is recognized by the speech recognition unit 71 as speech information, and the speech information is accepted by the instruction accepting unit 72 as an album saving instruction. The information management unit 77 stores the electronic album 61 in the storage device 50.

Figure 16:
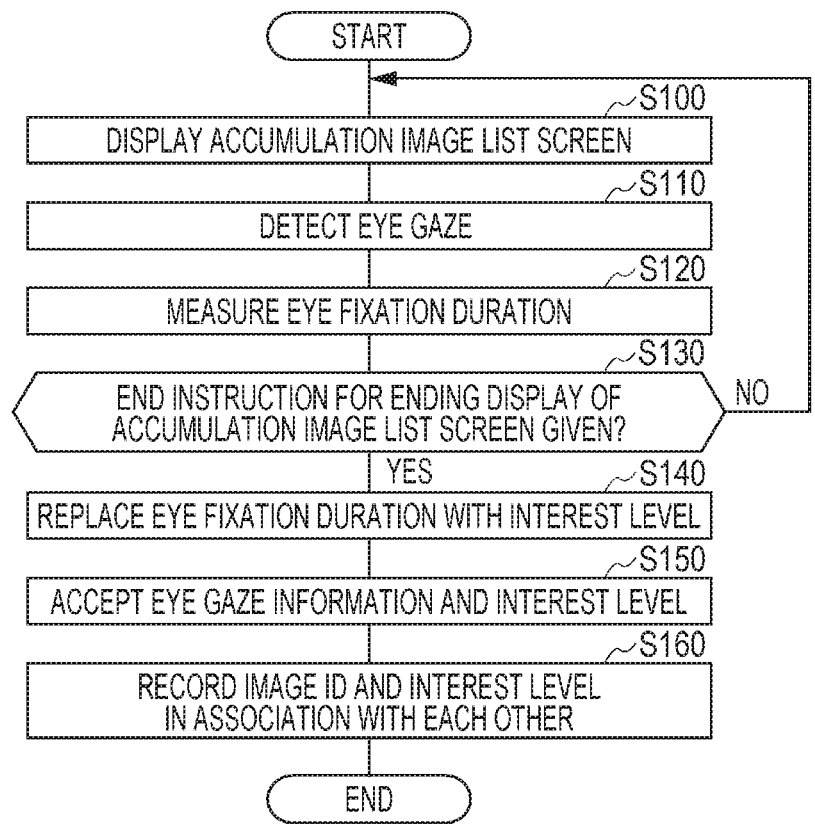
FIG. 16 is a flowchart illustrating a processing procedure from the start of display of the accumulation image list screen to the end.
Figure 17:
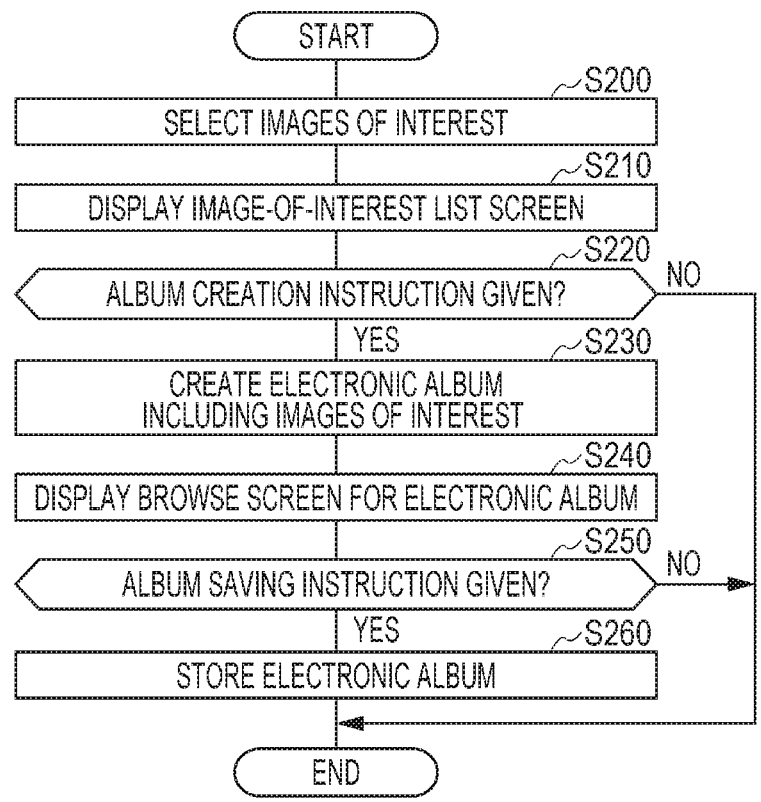
FIG. 17 is a flowchart illustrating a processing procedure from selection of images of interest to storing of an electronic album.

Hereinafter, operations performed in accordance with the above-described configuration are described with reference to the flowcharts in FIG. 16 and FIG. 17. First, the user 13 puts the HMD 11 on their head. Then, the user 13 accesses the control server 12 via the access authentication screen.

After access authentication, the folder selection screen 93 illustrated in the illustration above the arrow in FIG. 13 is displayed on the HMD 11. In the state where the folder selection screen 93 is displayed, when the user 13 speaks the name of the folder 90 for which the user 13 wants to display the list 44, speech information about the spoken utterance is accepted by the instruction accepting unit 72 as a distribution instruction for the accumulation image list screen 45. Then, the accumulation image list screen 45 is displayed on the HMD 11 as illustrated in the illustration below the arrow in FIG. 13 (step S100 in FIG. 16, display control step).

Simultaneously with display of the accumulation image list screen 45, obtaining of the captured image 85 from the eye gaze detection camera 29 by the captured-image obtaining unit 70 is started. The captured image 85 is output from the captured-image obtaining unit 70 to the detection unit 73.

In the detection unit 73, the eye gaze of the user 13 directed at one of the accumulation images 43 in the list 44 is detected on the basis of the captured image 85, as illustrated in FIG. 11 (step S110). Eye gaze information, which is the result of detecting the eye gaze, is output to the time measurement unit 74, the information accepting unit 76, and the display control unit 80.

In the time measurement unit 74, the eye fixation duration of the user 13 for the accumulation image 43 in the list 44 is measured (step S120). These processes from step S100 to S120 are repeatedly performed until an end instruction for ending display of the accumulation image list screen 45 is given by the user 13 (YES in step S130). Note that the end instruction is given by, for example, a spoken utterance including the words "end display" or the like.

After the end of display of the accumulation image list screen 45, the eye fixation duration is output to the evaluation unit 75 and replaced with an interest level in the evaluation unit 75 (step S140). The interest level is output to the information accepting unit 76.

In the information accepting unit 76, the eye gaze information from the detection unit 73 and the interest level from the evaluation unit 75 are accepted (step S150, information accepting step). Note that practically, as mentioned above, the eye gaze information is output to the information accepting unit 76 from the detection unit 73 at the time of step S110, and is converted to the image ID of the accumulation image, as illustrated in FIG. 12. The image ID and the interest level are output to the information management unit 77.

The image ID and the interest level are recorded by the information management unit 77 to the storage device 50 in association with each other as the image interest-level information 63 (step S160, information management step).

After recording of the image interest-level information 63, the image interest-level information 63 and the selection condition 64 are passed from the information management unit 77 to the selection unit 78. In the selection unit 78, the images of interest 100 are selected from among the plurality of accumulation images 43 in the list 44 (step S200 in FIG. 17). The images of interest 100 are output to the album creation unit 79 and the display control unit 80.

On the HMD 11, the image-of-interest list screen 102 as illustrated in the illustration above the arrow in FIG. 15 is displayed (step S210). In the state where the image-of-interest list screen 102 is displayed, when the user 13 says "create an album", speech information about the spoken utterance is accepted by the instruction accepting unit 72 as an album creation instruction (YES in step S220). The album creation instruction is output to the album creation unit 79.

In a case of accepting the album creation instruction from the instruction accepting unit 72, in the album creation unit 79, the electronic album 61 including the images of interest 100 is created (step S230). The electronic album 61 is output to the information management unit 77 and the display control unit 80.

On the HMD 11, the browse screen 105 for the electronic album 61 as illustrated in the illustration below the arrow in FIG. 15 is displayed (step S240). In the state where the browse screen 105 is displayed, when the user 13 says "save the album", speech information about the spoken utterance is accepted by the instruction accepting unit 72 as an album saving instruction (YES in step S250). In response to the album saving instruction, the electronic album 61 from the album creation unit 79 is stored in the storage device 50 by the information management unit 77 (step S260).

Note that, in a case where the user 13 says, for example, "create no album" to give an instruction opposite to the album creation instruction (NO in step S220), the process ends. In a case where the user 13 says, for example, "do not save the album" to give an instruction opposite to the album saving instruction (NO in step S250), the process similarly ends.

The eye fixation duration of the user 13 for one of the accumulation images 43 in the list 44 on the accumulation image list screen 45 is measured, and the image ID of the accumulation image 43 and an interest level, which corresponds to the information about the eye fixation duration, are recorded in association with each other as the image interest-level information 63. Therefore, for example, the images of interest 100 can be selected in accordance with the image interest-level information 63 or the electronic album 61 that includes the images of interest 100 can be created so that the information about the eye fixation duration for the accumulation image 43 can be effectively used.

The images of interest 100 are selected by the selection unit 78 in accordance with the image interest-level information 63 from the information management unit 77. Therefore, the user 13 needs to only browse the accumulation image list screen 45 following their interests and need not perform an operation of selecting an image that the user 13 is interested in from among the accumulation images 43 in the list 44. Accordingly, the user 13's convenience can be increased.

The electronic album 61 that includes the images of interest 100 is created by the album creation unit 79. Therefore, the electronic album 61 that noticeably reflects the interest levels of the user 13 for the accumulation images 43 can be easily created.

The eye fixation duration is replaced with an interest level by the evaluation unit 75, and the interest level obtained as a result of replacement is recorded as the information about the eye fixation duration, and therefore, the information about the eye fixation duration can be simplified. Accordingly, the selection condition 64 for the images of interest 100 can also be simplified.

Note that the eye fixation duration itself may be recorded as the information about the eye fixation duration without replacing the eye fixation duration with an interest level. In this case, as the selection condition 64, for example, an eye fixation duration of 20 seconds or more is set. As the selection condition 64, the number of the images of interest 100 to be selected may be preset, the accumulation images 43 may be selected in descending order of eye fixation duration as the images of interest 100, and selection may be stopped when the number of the selected images of interest 100 reaches the preset number.

Alternatively, a GUI for the user 13 to consciously select the images of interest 100 may be provided, the difference between the number of the images of interest 100 that are selected via the GUI and the planned number of images to be selected, the planned number being determined on the basis of, for example, the number of pages of the electronic album 61, may be calculated, and a number of images for the shortage may be selected by the selection unit 78. Accordingly, in an operation of selecting images that the user 13 wants to include in the electronic album 61, images that the user 13 is greatly interested in can be selected in an auxiliary manner. Therefore, images that the user 13 is interested in can be naturally and efficiently selected while a conventional procedure for creating an electronic album for which the user 13's intention is assigned the highest priority is followed.

Here, a configuration may be employed in which an image that is similar to an image selected by the user 13 via the GUI is not selected by the selection unit 78 as the image of interest 100 even if the eye fixation duration is relatively long and meets the selection condition 64. The similar image may be determined by using a well-known image analysis technique for calculating the similarity of an image. Alternatively, the similar image may be determined on the basis of the degree of approximation of the image capture date and time.

For example, in a case where the user 13 selects one image from among a plurality of images obtained by capturing an image of the same photographic subject a plurality of times successively, there is a possibility that the user 13 selects the image while comparing the plurality of images with each other. In such a case, it is preferable that the similar image be removed from consideration as a possible image of interest 100 as described above so that, for example, a plurality of images of the same photographic subject or a plurality of images having similar composition are not selected as the images of interest 100.

Second Embodiment

In the first embodiment described above, the example case has been described in which the electronic album 61 that includes the images of interest 100 is newly created when the images of interest 100 are selected by the selection unit 78. In a case where the electronic album 61 already exists, a situation may naturally occur in which the user 13 desires to add the images of interest 100 to the existing electronic album 61. In a second embodiment illustrated in FIG. 18 and FIG. 19, the images of interest 100 are added to the existing electronic album 61. Note that the existing electronic album 61 is hereinafter referred to as an electronic album 61E.

Figure 18:
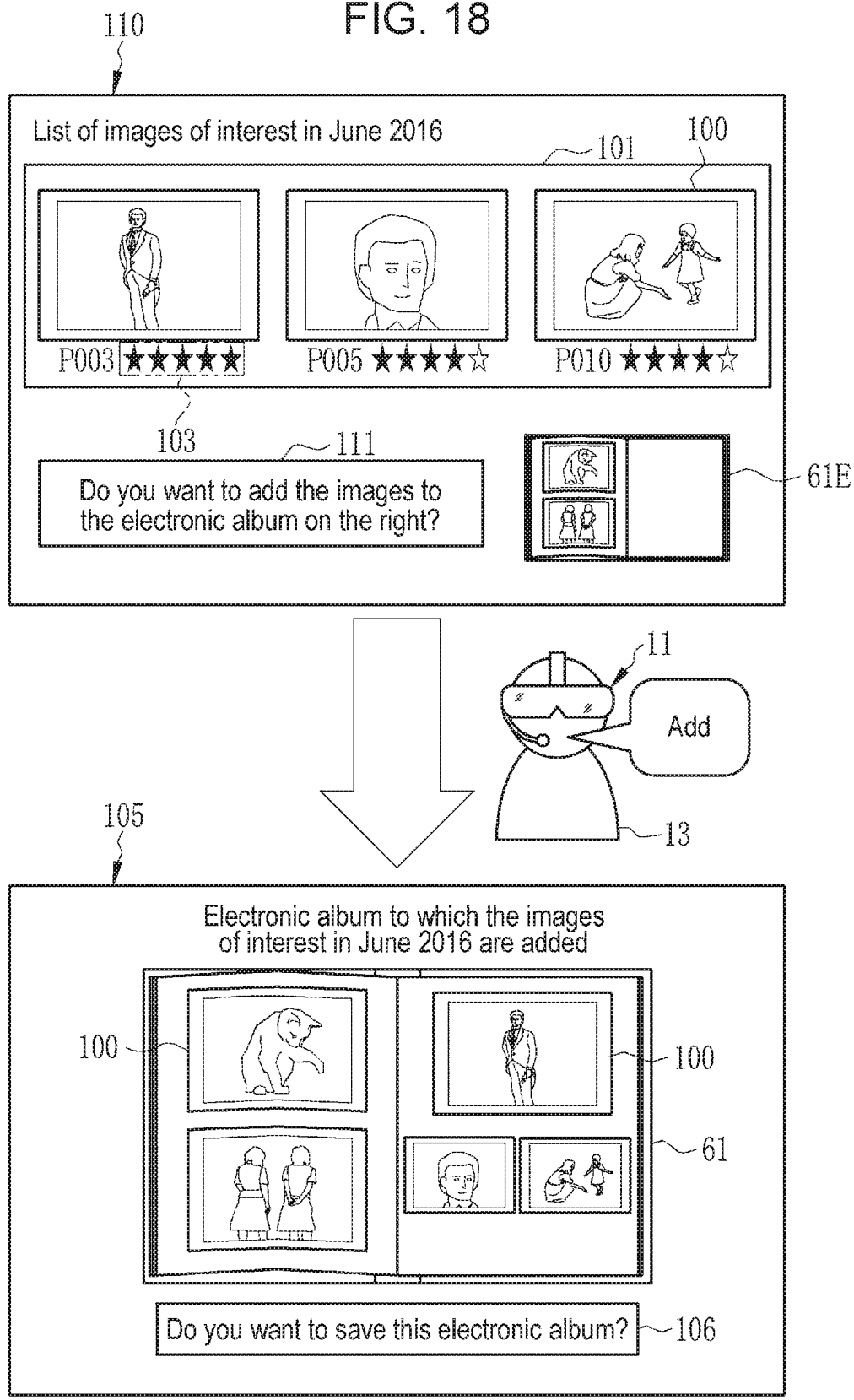
FIG. 18 is a diagram illustrating a display transition from an image-of-interest list screen to the browse screen for an electronic album in a second embodiment.

In the second embodiment, after the end of display of the accumulation image list screen 45, the display control unit 80 causes an image-of-interest list screen 110 as illustrated in the illustration above the arrow in FIG. 18 to be displayed on the HMD 11. On the image-of-interest list screen 110, a message 111 asking whether the images of interest 100 are to be added to the electronic album 61E and the electronic album 61E in the form of an icon are displayed in addition to the list 101 the same as the list 101 on the image-of-interest list screen 102 illustrated in FIG. 15 in the first embodiment described above.

The procedure for causing the electronic album 61E to be displayed on the image-of-interest list screen 110 is as follows. First, the information management unit 77 reads the electronic album 61E from the storage device 50. In a case where a plurality of electronic albums 61E are present, the information management unit 77 reads the newest electronic album 61E. The information management unit 77 passes the read electronic album 61E to the album creation unit 79 and the display control unit 80. The display control unit 80 causes the electronic album 61E from the information management unit 77 to be displayed on the image-of-interest list screen 110.

Figure 19:
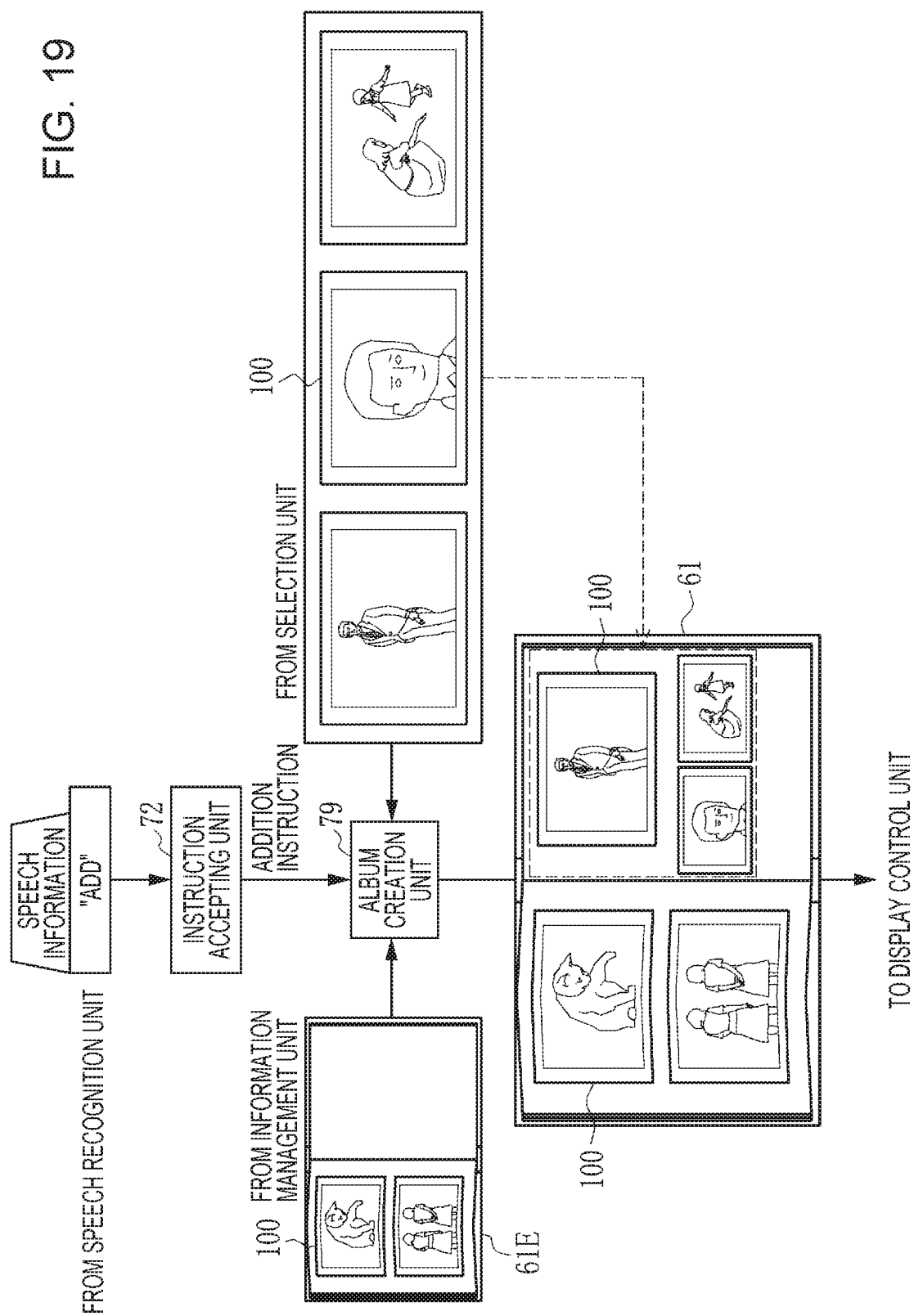
FIG. 19 is a diagram illustrating functions of an instruction accepting unit and an album creation unit in the second embodiment.

In the state where the image-of-interest list screen 110 is displayed, when the user 13 says "add", the spoken utterance including the word "add" is recognized by the speech recognition unit 71 as speech information, and the speech information is accepted by the instruction accepting unit 72 as an addition instruction for adding the images of interest 100 to the electronic album 61E, as illustrated in FIG. 19. That is, in the second embodiment, the instruction accepting unit 72 functions as an addition instruction accepting unit.

In FIG. 19, the instruction accepting unit 72 outputs the addition instruction to the album creation unit 79. In response to the addition instruction from the instruction accepting unit 72, the album creation unit 79 adds the images of interest 100 from the selection unit 78 to the electronic album 61E from the information management unit 77 to create the electronic album 61. The album creation unit 79 outputs the created electronic album 61 to the display control unit 80. Note that, in FIG. 19, only the instruction accepting unit 72 and the album creation unit 79 necessary for description are illustrated, and the other units, such as the detection unit 73 and the time measurement unit 74, are omitted.

Similarly to the case illustrated in the illustration below the arrow in FIG. 15 in the first embodiment described above, the display control unit 80 causes the browse screen 105 for the electronic album 61 from the album creation unit 79 to be displayed on the HMD 11, as illustrated in the illustration below the arrow in FIG. 18. The process that is subsequently performed, such as storing of the electronic album 61, is the same as that in the first embodiment described above, and therefore, a description thereof will be omitted.

As described above, an addition instruction from the user 13 for adding the images of interest 100 to the electronic album 61E is accepted, and the electronic album 61 is created in response to the addition instruction. Therefore, the necessity to create the electronic album 61 each time the images of interest 100 are selected is removed, and the number of the electronic albums 61 can be decreased. Accordingly, the electronic albums 61 can be easily organized, and eventually, the accumulation images 43 can be easily organized.

Note that, in a case where the plurality of electronic albums 61E are present, a configuration may be employed in which the user 13 is allowed to select the electronic album 61E to which the images of interest 100 are to be added. Further, a function of editing the electronic album 61E, such as integrating the plurality of electronic albums 61E to create one electronic album 61, deleting the image of interest 100 added to the electronic album 61E, or changing the layout of the image of interest 100 (the size of the image of interest 100 or the position at which the image of interest 100 is affixed), may be added.

Third Embodiment

In the first embodiment described above, in response to a reproduction instruction for the accumulation image 43 on which the mark 95 is displayed, the reproduction display screen 96 having the enlarged image 97 is displayed on the HMD 11, as illustrated in FIG. 14. However, the display position of the reproduction display screen 96 is fixed to a predetermined position in the virtual space VS similarly to the other screens. In a third embodiment illustrated in FIG. 20 to FIG. 22, the reproduction display screen 96 having the enlarged image 97 is reproduced and displayed on an actual object in the real space RS.

Figure 20:
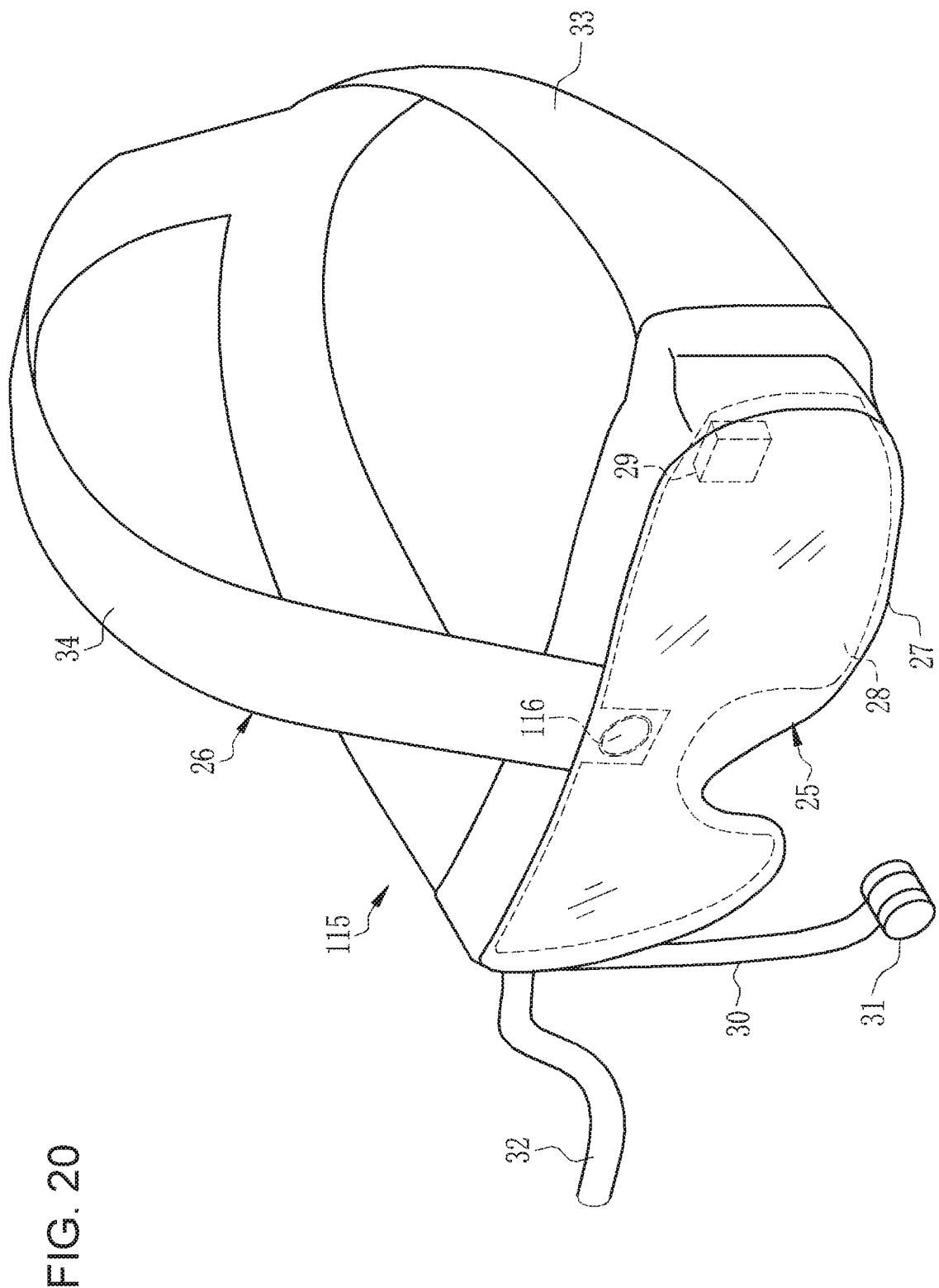
FIG. 20 is a perspective external view of a head-mounted display with a field-of-view camera.

In FIG. 20, an HMD 115 according to the third embodiment is provided with a field-of-view camera 116 in addition to the parts that constitute the HMD 11 according to the first embodiment described above. The field-of-view camera 116 is provided, for example, at the center of the upper part of the main body part 25 that faces the *glabella* of the user 13 when the user 13 is wearing the HMD 115. The field-of-view camera 116 captures, at a predetermined frame rate (for example, 30 frames/second), an image of the field of view that is substantially the same as the augmented reality space ARS recognized by the user 13 through the HMD 115. The field-of-view camera 116 successively transmits captured images (hereinafter referred to as "field-of-view images") 121 (see FIG. 22) to the control server 12.

Figure 21:
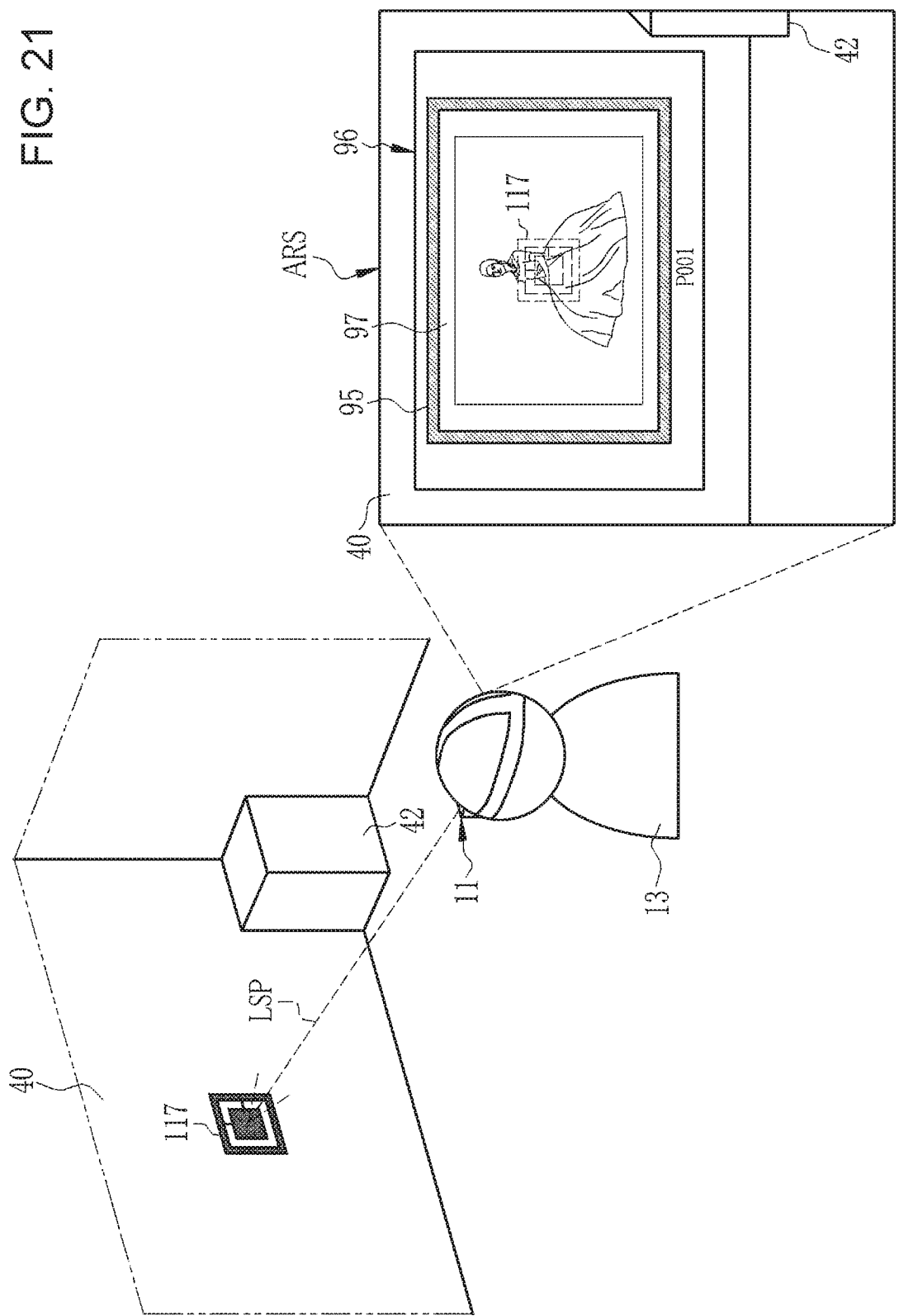
FIG. 21 is a diagram illustrating a state where the reproduction display screen is reproduced and displayed on a wall.
Figure 22:
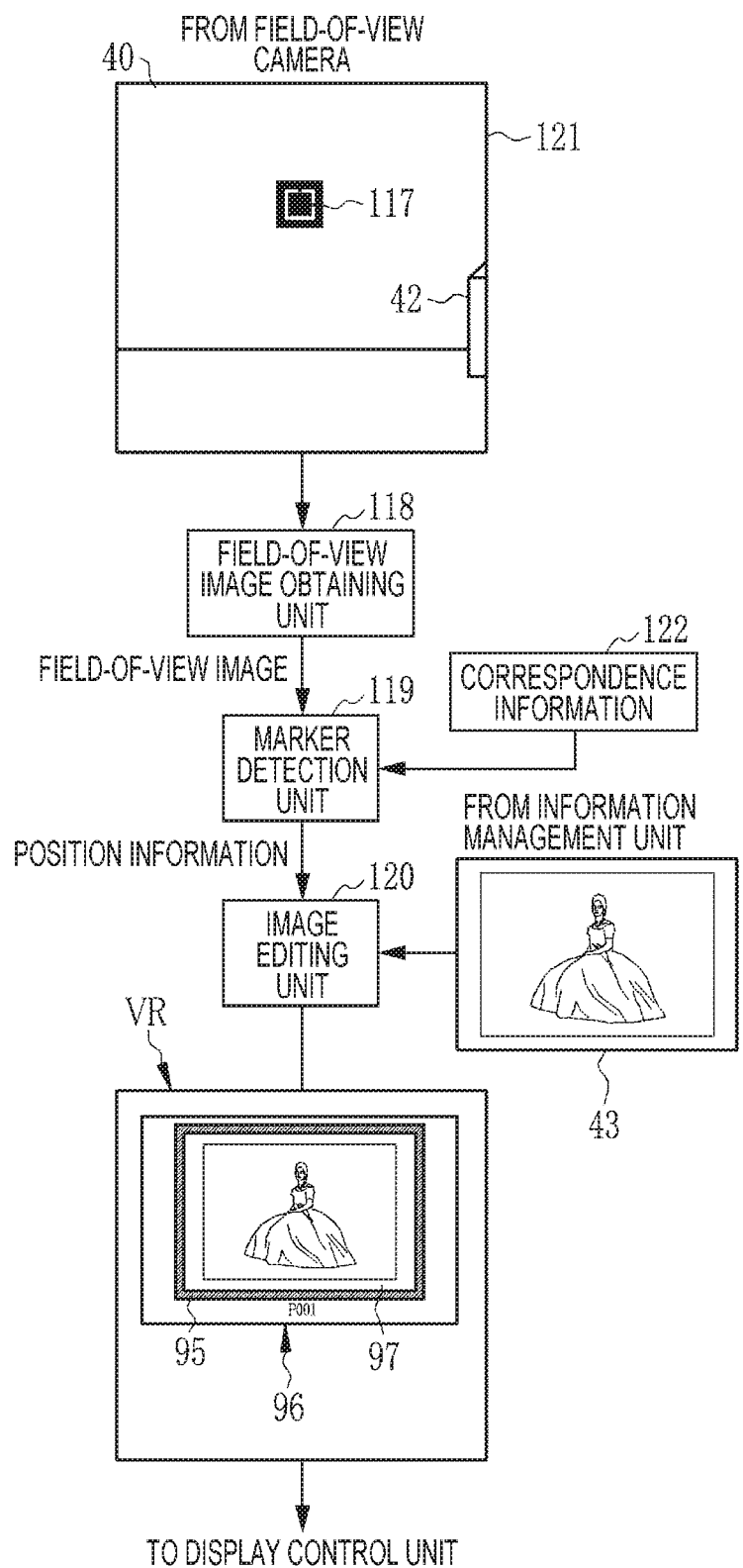
FIG. 22 is a diagram illustrating functions of the CPU of the control server according to a third embodiment.

As illustrated in FIG. 21, in the third embodiment, a marker 117 is put on the wall 40 of the home 14. The marker 117 is, for example, a sheet having a square frame on which a regular pattern in white and black and identification lines for identifying the top, the bottom, the left, and the right are drawn. The marker 117 indicates a position in the real space RS at which the reproduction display screen 96 appears. That is, the wall 40 on which the marker 117 is put corresponds to the actual object in the real space RS on which the accumulation images 43 are reproduced and displayed.

Here, the user 13 says "reproduce", as illustrated in FIG. 14, to give a reproduction instruction for reproducing the accumulation image 43 on which the mark 95 is displayed. Then, the user 13 positions the eye gaze point LSP on the marker 117, as represented by a dashed line. Then, the user 13 can visually recognize the reproduction display screen 96 that is displayed in a predetermined region centered on the marker 117, as indicated in the augmented reality space ARS.

In FIG. 22, in the third embodiment, a field-of-view image obtaining unit 118, a marker detection unit 119, and an image editing unit 120 are implemented in the CPU 52 in addition to the captured-image obtaining unit 70, the speech recognition unit 71, the instruction accepting unit 72, the detection unit 73, the time measurement unit 74, the evaluation unit 75, the information accepting unit 76, the information management unit 77, the selection unit 78, the album creation unit 79, and the display control unit 80 illustrated in FIG. 6 in the first embodiment described above (these units are not illustrated in FIG. 22).

The field-of-view image obtaining unit 118 obtains the field-of-view images 121 successively transmitted from the field-of-view camera 116 of the HMD 115 at a predetermined frame rate. The field-of-view image obtaining unit 118 outputs the obtained field-of-view images 121 to the marker detection unit 119.

In a case where the eye gaze point LSP of the user 13 is positioned on the marker 117, the marker 117 appears in the field-of-view image 121 as illustrated. The marker detection unit 119 recognizes the marker 117 in the field-of-view image 121 by using a well-known image recognition technique. Then, the marker detection unit 119 detects the length and angle of each side of the square that forms the marker 117 in the captured image 121 and the positions of the identification lines for identifying the top, the bottom, the left, and the right, and detects the three-dimensional position of the HMD 115 (the eye of the user 13) relative to the marker 117 on the basis of these pieces of detected information and correspondence information 122. The marker detection unit 119 outputs information about the detected position (hereinafter referred to as "position information") to the image editing unit 120.

The position information includes, for example, the position coordinates of the HMD 115 in a three-dimensional space in which the origin corresponds to the center of the marker 117. The correspondence information 122 is a mathematical expression that is used to calculate the position coordinates of the HMD 115 in the three-dimensional space in which the origin corresponds to the center of the marker 117. In this mathematical expression, for example, the length and angle of each side of the square that forms the marker 117 in the field-of-view image 121 and the positions of the identification lines for identifying the top, the bottom, the left, and the right are variables. Note that the three-dimensional space in which the origin corresponds to the center of the marker 117 is a three-dimensional space in which the origin corresponds to the center of the marker 117, the XY plane corresponds to a flat surface on which the marker 117 is placed (in this case, the wall 40), and the Z axis corresponds to an axis orthogonal to the flat surface on which the marker 117 is placed (in this case, the horizontal axis).

The image editing unit 120 edits the reproduction display screen 96 based on the accumulation image 43 on which the mark 95 is displayed, the accumulation image 43 being received from the information management unit 77, in accordance with the position information from the marker detection unit 119. More specifically, the image editing unit 120 performs a rotation process and an enlarging/reducing process for the reproduction display screen 96 so that the reproduction display screen 96 is in an orientation and size when viewed from the position of the HMD 115 indicated by the position information. The image editing unit 120 outputs the edited reproduction display screen 96 to the display control unit 80.

The reproduction display screen 96 is edited by the image editing unit 120 on the basis of the position information. Therefore, for example, when the user 13 comes closer to the marker 117, the reproduction display screen 96 is enlarged and displayed as the user 13 comes closer. To the contrary, when the user 13 moves away from the marker 117, the reproduction display screen 96 is reduced and displayed as the user 13 moves away. That is, the display of the reproduction display screen 96 changes in accordance with the three-dimensional positional relationship between the HMD 115 (user 13) and the marker 117.

As described above, the reproduction display screen 96 (the accumulation image 43) is reproduced and displayed on an actual object in the real space RS, and therefore, the user 13 can cause the reproduction display screen 96 to be projected on a place as desired to enjoy the image.

Note that an actual object in the real space RS on which the reproduction display screen 96 is reproduced and displayed is not limited to the wall 40 in the example described above and may be, for example, a ceiling, a desk, a paper album, or a photo frame. Alternatively, a technique may be employed in which the reproduction display screen 96 is caused to appear on a set specific actual object without using the marker 117. In this case, the specific actual object present in the field-of-view image 121 is recognized by using an image recognition technique, the recognized specific actual object is assumed to be the marker 117, and the reproduction display screen 96 is displayed on the specific actual object.

Note that the example case of the HMD 11 of a transparent type has been described in the first embodiment described above; however, in a case of using an HMD, such as the HMD 115 in the third embodiment, that is provided with the field-of-view camera 116, a non-transparent-type HMD that superimposes a virtual image on the field-of-view image 121 output from the field-of-view camera 116 and that projects and displays the resulting image on the inside surface of the screen 28 may be used.

Fourth Embodiment

Figure 7:
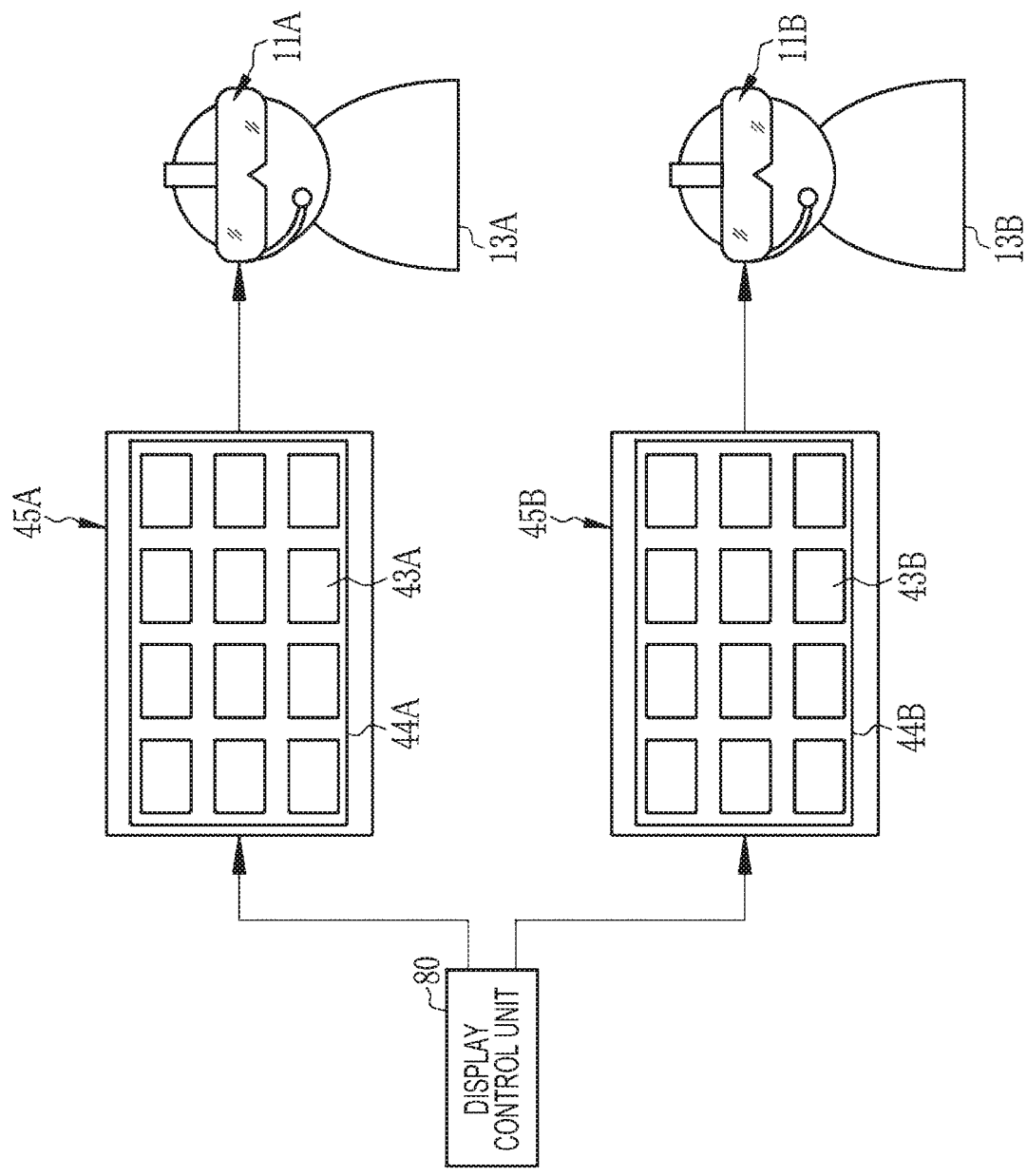
FIG. 7 is a diagram illustrating a state where, on a head-mounted display worn by each of a plurality of users, a corresponding accumulation image list screen is displayed.

As illustrated in FIG. 7, the display control unit 80 can display the accumulation image list screens 45 on the respective HMDs 11 that are worn by the plurality of users 13. In FIG. 7, the accumulation image list screens 45 that correspond to the respective HMDs 11 of the plurality of users 13 have different content; however, the accumulation image list screens 45 having the same content can be displayed on the respective HMDs 11 of the plurality of users 13, as a matter of course.

In a case of causing the accumulation image list screens 45 having the same content to be displayed on the respective HMDs 11 of the plurality of users 13, the plurality of users 13 located in remote places are made to be able to communicate with each other by spoken utterances by using, for example, an Internet telephone function or the like, the spoken utterances being converted to electric signals by the microphone 31. Accordingly, the plurality of users 13 can browse the accumulation images 43 while enjoying conversations.

In such a situation, there may be a case where one user 13 wants to share the accumulation image 43 that the user 13 is interested in with the other users 13. In a fourth embodiment illustrated in FIG. 23 to FIG. 25, sharing of the accumulation image 43 among the plurality of users 13 is facilitated.

Figure 23:
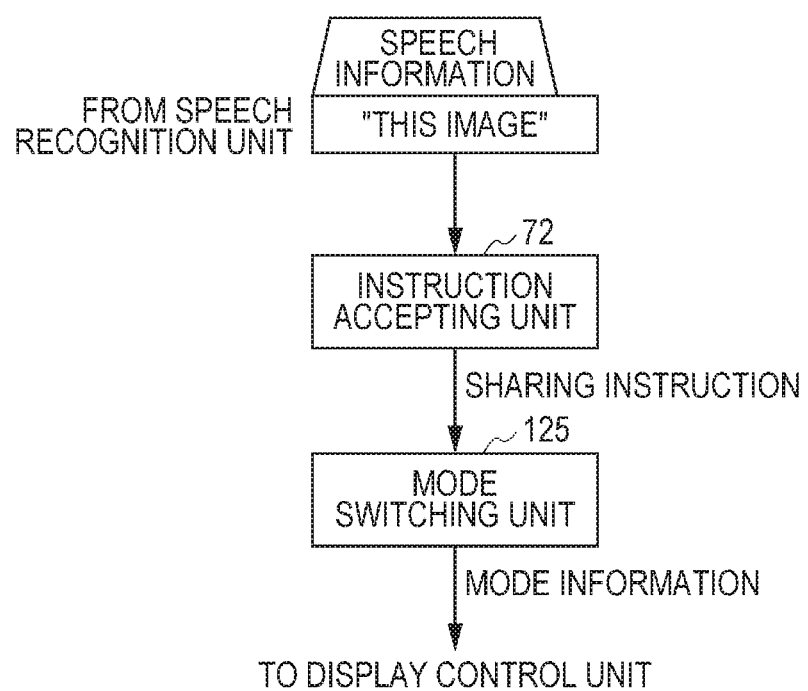
FIG. 23 is a diagram illustrating functions of the CPU of the control server according to a fourth embodiment.

In FIG. 23, in the fourth embodiment, a mode switching unit 125 is implemented in the CPU 52 in addition to the captured-image obtaining unit 70, the speech recognition unit 71, the instruction accepting unit 72, the detection unit 73, the time measurement unit 74, the evaluation unit 75, the information accepting unit 76, the information management unit 77, the selection unit 78, the album creation unit 79, and the display control unit 80 illustrated in FIG. 6 in the first embodiment described above (the units other than the instruction accepting unit 72 are not illustrated in FIG. 23). The instruction accepting unit 72 accepts a sharing instruction given by a spoken utterance of the user 13 saying "this image". That is, in the fourth embodiment, the instruction accepting unit 72 corresponds to a sharing instruction accepting unit. The instruction accepting unit 72 outputs the sharing instruction to the mode switching unit 125.

The mode switching unit 125 switches between a shared mode and a non-shared mode. The shared mode is a mode in which the accumulation image 43 in the list 44 at which the eye gaze of the user 13 giving a sharing instruction is directed is shared among the plurality of users 13. On the other hand, the non-shared mode is a mode in which the accumulation image at which the eye gaze of the user 13 is directed is not shared among the plurality of users 13. Hereinafter, the user 13 who gives a sharing instruction is referred to as an instructing user, and the accumulation image 43 in the list 44 at which the eye gaze of the instructing user is directed is referred to as an eye fixation target image.

The mode switching unit 125 usually sets the mode to the non-shared mode and switches the mode to the shared mode when receiving a sharing instruction from the instruction accepting unit 72. After a predetermined time (for example, 30 seconds) has elapsed since switching to the shared mode, the mode switching unit 125 automatically returns the mode to the non-shared mode. The mode switching unit 125 outputs information about the mode (hereinafter referred to as "mode information") to the display control unit 80.

In a case where the mode information from the mode switching unit 125 indicates the shared mode, the display control unit 80 causes the mark 95 to be displayed on the eye fixation target image on the accumulation image list screens 45 of all of the users 13. On the other hand, in a case where the mode information from the mode switching unit 125 indicates the non-shared mode, the display control unit 80 causes the mark 95 to be displayed on the accumulation image 43 in each list 44 at which the eye gaze of a corresponding one of the plurality of users 13 is directed.

Figure 24:
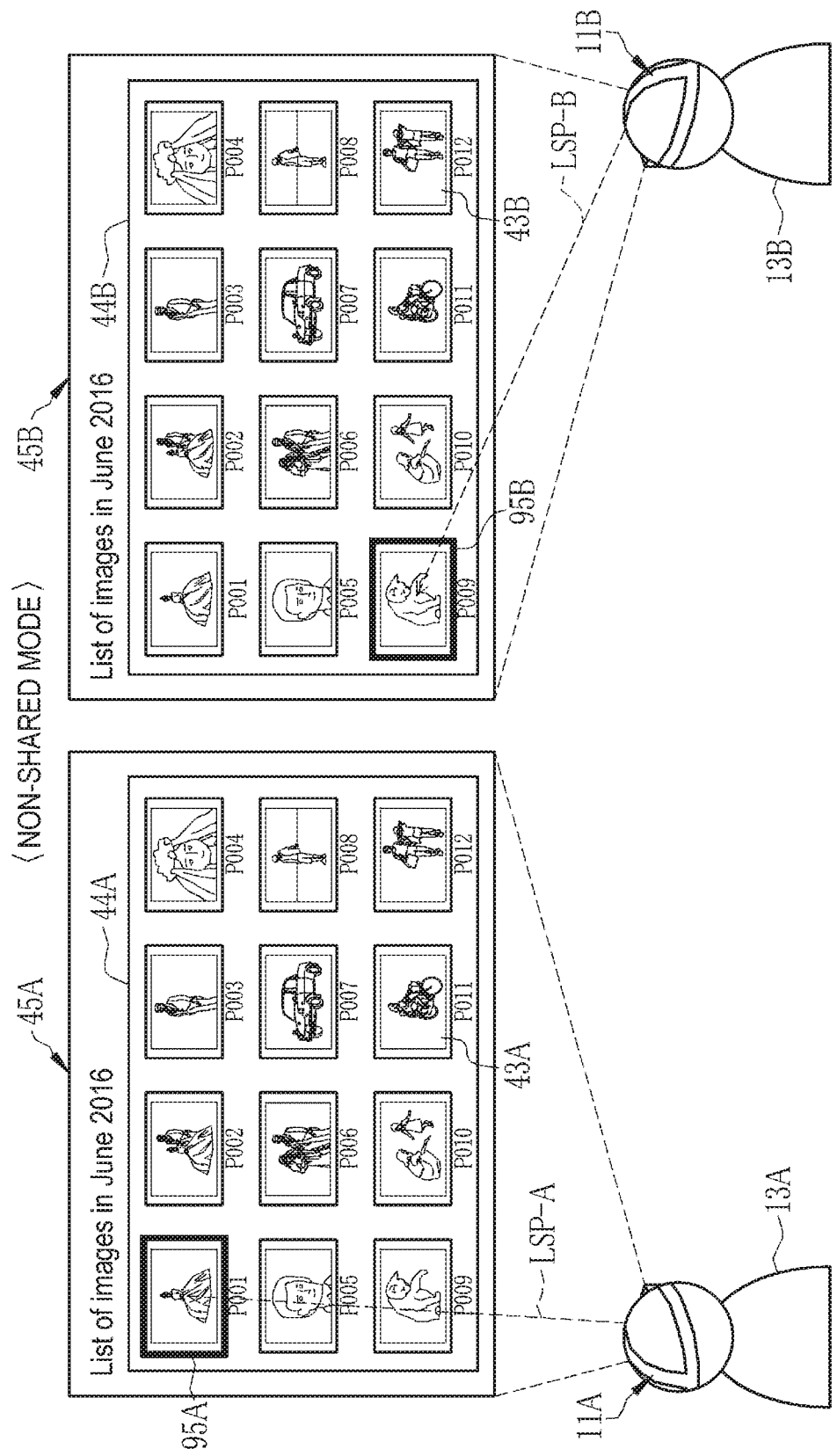
FIG. 24 is a diagram illustrating accumulation image list screens that are visually recognized by respective users in a case of a non-shared mode.
Figure 25:
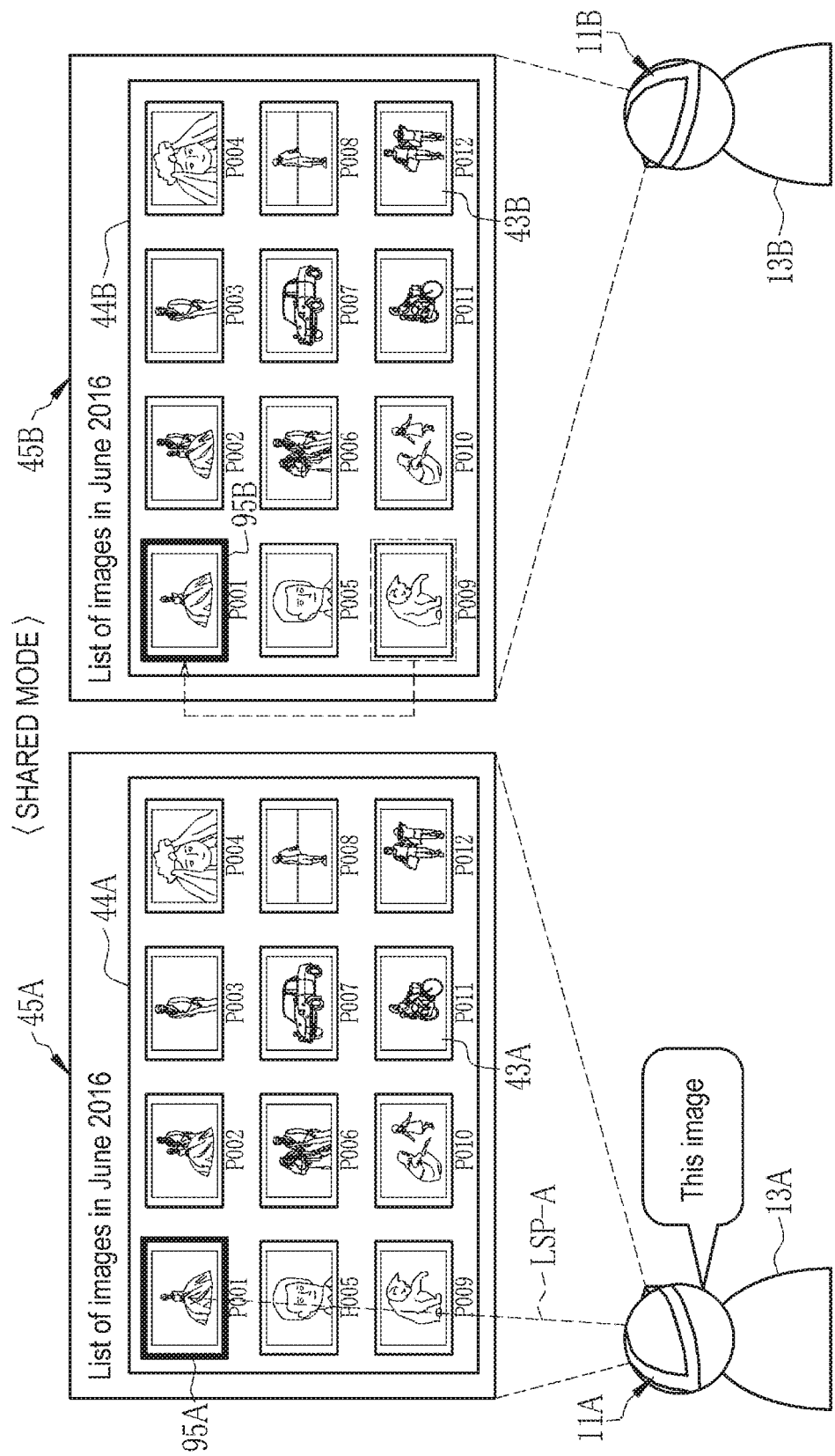
FIG. 25 is a diagram illustrating the accumulation image list screens that are visually recognized by the respective users in a case of a shared mode.

FIG. 24 and FIG. 25 illustrate a case where two users, namely, the users 13A and 13B, respectively browse the accumulation image list screens 45A and 45B having the same content through the HMDs 11A and 11B. FIG. 24 illustrates a case of the non-shared mode, and FIG. 25 illustrates a case of the shared mode. The users 13A and 13B are made to be able to communicate with each other by spoken utterances by using, for example, an Internet telephone function or the like. Note that "A" or "B" are added to the reference numerals of the accumulation images 43, the lists 44, and the accumulation image list screens 45 so as to be distinguishable from each other for convenience sake; however, the images, list, and screen having the reference numerals with "A" and those having the reference numerals with "B" have entirely the same content.

In FIG. 24 that illustrates a case of the non-shared mode, an eye gaze point LSP-A of the user 13A is located at the accumulation image 43A having the image ID "P001". On the other hand, an eye gaze point LSP-B of the user 13B is located at the accumulation image 43B having an image ID "P009". Therefore, a mark 95A is displayed on the accumulation image 43A having the image ID "P001" on the accumulation image list screen 45A, and a mark 95B is displayed on the accumulation image 43B having the image ID "P009" on the accumulation image list screen 45B.

As illustrated in FIG. 25, when the user 13A says "this image", the spoken utterance is recognized by the speech recognition unit 71 as speech information, and the speech information is accepted by the instruction accepting unit 72 as a sharing instruction. Then, the mode switching unit 125 switches the mode from the non-shared mode illustrated in FIG. 24 to the shared mode. Accordingly, the mark 95B displayed on the accumulation image 43B having the image ID "P009" is moved to the accumulation image 43B having the image ID "P001" on the accumulation image listing screen 45B. After a predetermined time has elapsed, the state is automatically restored to the state of the non-shared mode illustrated in FIG. 24. In this case, the user 13A corresponds to the instructing user, and the accumulation image 43 having the image ID "P001" corresponds to the eye fixation target image.

As described above, the image display system 10 has the shared mode in which, in response to a sharing instruction from one user 13, an eye fixation target image at which the eye gaze of the instructing user giving the sharing instruction is directed is shared among the plurality of users 13, and the mark 95 is caused to be displayed on the eye fixation target image in the shared mode. Therefore, the eye fixation target image can be easily shared among the plurality of users 13.

Switching between the shared mode and the non-shared mode is performed. Therefore, only when one user 13 desires to share an eye fixation target image with the other users 13, switching to the shared mode can be performed. Accordingly, a situation where an eye fixation target image of one user 13 is unintentionally known to the other users 13 can be prevented from occurring, and the privacy of the user 13 can be protected.

The sharing instruction is given by a simple spoken utterance of the user 13 saying, for example, "this image", and therefore, the eye fixation target image can be shared without giving the other users 13 a detailed explanation of the features of the eye fixation target image (the name of a person or a scene present in the image, the tint, the arrangement of objects, and so on). After a predetermined time has elapsed since switching to the shared mode, the mode is automatically returned to the non-shared mode, and therefore, the user 13 need not give an instruction for returning the mode to the non-shared mode, and a situation where the user 13 forgets to return the mode to the non-shared mode and the eye gaze thereof is unintentionally known to the other users 13 does not occur.

In FIG. 24 and FIG. 25, there are two users, namely, the users 13A and 13B; however, the number of the users 13 may be two or more. FIG. 24 illustrates the example case where the users 13A and 13B respectively browse the accumulation image list screens 45A and 45B having the same content in the non-shared mode; however, the present invention is not limited to this case. In the non-shared mode, the users 13 may respectively browse the accumulation image list screens 45 having different content. In this case, at the time when the mode is switched to the shared mode, the accumulation image list screen 45 having content the same as the content of the accumulation image list screen 45 that the instructing user is browsing is displayed on the HMDs 11 of the other users 13.

Note that a sharing instruction need not be given by a spoken utterance of the user 13. For example, a sharing instruction given by the user 13 making a gesture with their hand may be accepted. In this case, the HMD 115 with the field-of-view camera 116 illustrated in FIG. 20 is used. Then, an image of a gesture made by using the hand of the user 13 is captured by the field-of-view camera 116, and the gesture present in the field-of-view image 121 is detected by using an image recognition technique. Alternatively, among the plurality of users 13, each user 13 is made to be able to visually recognize gestures made by the other users 13 by using, for example, a videophone function or the like. As a gesture for giving the sharing instruction, for example, a gesture in which the user 13 raises and points the index finger ahead or a gesture for signing "share" can be employed.

In addition to the sharing instruction, another instruction, such as the distribution instruction for the accumulation image list screen 45, the album creation instruction for creating the electronic album 61, or the addition instruction for adding the images of interest 100 to the electronic album 61E, need not be an instruction given by a spoken utterance and may be an instruction given by making a gesture using the hand of the user 13. As a gesture for giving the addition instruction, for example, a drag-and-drop gesture in which, in a state where the image-of-interest list screen 110 illustrated in the illustration above the arrow in FIG. 18 is displayed, the user 13 selects the image of interest 100 with their finger and moves the image of interest 100 to the electronic album 61E in the form of an icon can be employed.

As the reproduction instruction for reproducing the accumulation image 43, the technique described in JP2014-143595A may be employed in which an image on which a user continuously fixes their eyes for a predetermined duration or more is reproduced and displayed.

Further, the user 13 may be given an operation unit, and various instructions from the operation unit may be accepted.

The evaluation criteria 62 are not limited to those described in the first embodiment described above. For example, the interest levels need not be represented by the five levels of 1 to 5 and may be represented by three levels of high, medium, and low. The evaluation criteria 62 may be customizable by the user. For example, the number of seconds set for the eye fixation duration may be changed. The selection condition 64 may be similarly customizable by the user 13. For example, the condition "the interest level of 4 or higher" may be changed to a condition "the interest level of 3 or higher".

The words in a spoken utterance for giving an instruction, such as the distribution instruction for the accumulation image list screen 45 or the album creation instruction for creating the electronic album 61, are not limited to those described in the embodiments described above and may be customizable by the user 13. For example, the words "create an album" for giving the album creation instruction may be modified to the words "make an album", and the words "this image" for giving the sharing instruction may be modified to the words "this one".

The accumulation image list screen 45 may be integrated with the image-of-interest list screen 102 or 110. Specifically, on the accumulation image list screen 45, the list 101 of the images of interest 100 may be displayed adjacent to the list 44 of the accumulation images 43. The electronic album 61E in the form of an icon illustrated in FIG. 18 may be displayed on the accumulation image list screen 45. When the accumulation image list screen 45 is integrated with the image-of-interest list screen 102 or 110, transitions between displayed screens are reduced, which makes the look of the display simple.

The HMD 11 is not limited to the type in which the protective frame 27 in a goggle form entirely covers the both eyes of the user 13 and the band part 26 is fixed to the head of the user 13 as in the embodiments described above. An eyeglass-type HMD having temples that fit around the ears of the user 13, nose pads that rest below the inner corners of the eyes, a rim for holding the screen, and so on may be used.

The eye gaze detection camera 29 need not be mounted on the HMD 11. The eye gaze detection camera 29 may be placed at any position as long as at least an image of motion of the eyeball of the user 13 can be captured. Further, the field-of-view camera 116 illustrated in FIG. 20 need not be mounted on the HMD 115. Therefore, the field-of-view camera 116 need not capture an image of the field of view that is the same as the augmented reality space ARS recognized by the user 13 through the HMD 115.

In the first embodiment described above, a visible-light camera is used as the eye gaze detection camera 29 to detect the eye gaze of the user 13 on the basis of the position of the iris 87 relative to the inner corner 86 present in the captured image 85; however, the present invention is not limited to this. An infrared camera may be used as the eye gaze detection camera 29 to detect the eye gaze of the user 13 on the basis of a reference point, which is the corneal reflex, and a moving point, which is the pupil.

The user 13 is made to recognize, through the HMD 11, not the augmented reality space ARS according to the embodiments described above but a virtual reality space formed of only a virtual image in which information about the real space RS is blocked.

Figure 26:
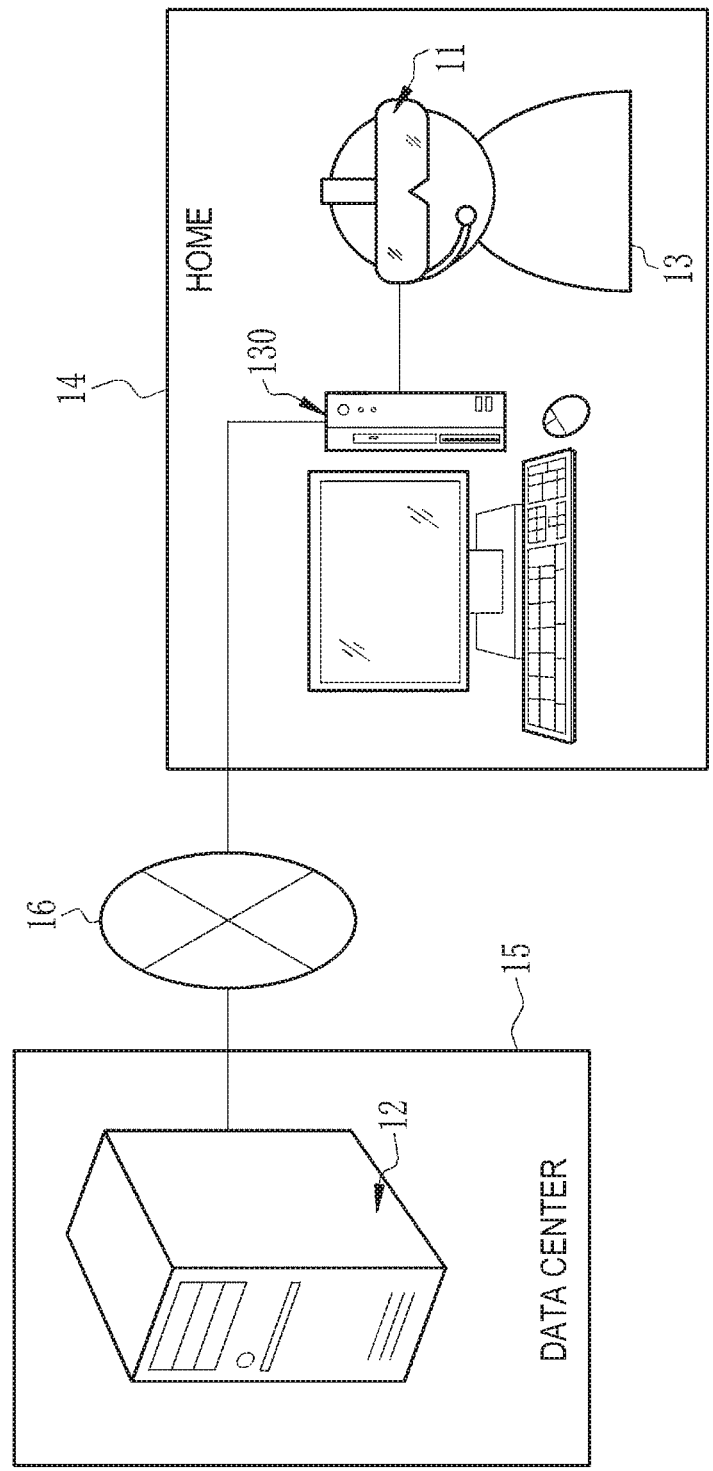
FIG. 26 is a diagram illustrating another example of a control apparatus.

In the embodiments described above, the functions of the control apparatus for the HMD 11 are fulfilled by the control server 12; however, the present invention is not limited to this. For example, a personal computer 130 owned by the user 13 may fulfill all or some of the functions of the control apparatus, as illustrated in FIG. 26. For example, functions other than the functions of the information accepting unit 76 and the information management unit 77 are fulfilled by the personal computer 130. In this case, the control server 12 and the personal computer 130 constitute the control apparatus. The eye gaze information, the interest levels, the layout information, the electronic album 61, and so on are transmitted to the control server 12 from the personal computer 130, and the accumulation images 43, the image interest-level information 63, the selection condition 64, and so on are transmitted to the personal computer 130 from the control server 12.

Figure 27:
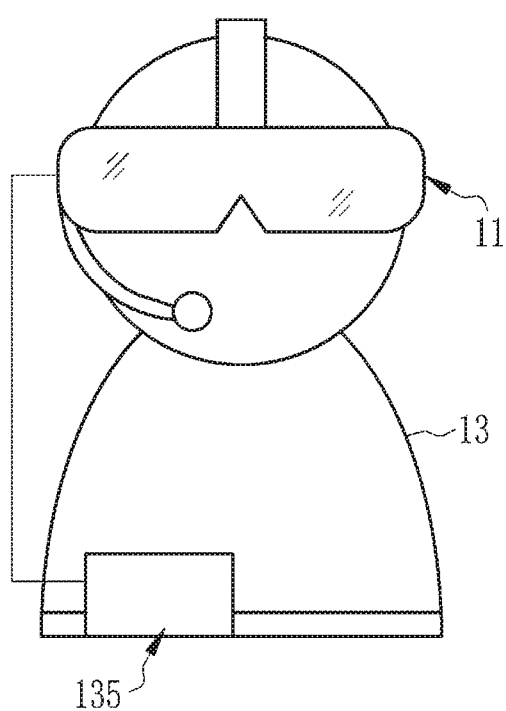
FIG. 27 is a diagram illustrating yet another example of the control apparatus.

Alternatively, a portable computer 135 that the user 13 can wear on, for example, the waist and carry may fulfill the functions of the control apparatus, as illustrated in FIG. 27. In this case, the portable computer 135 that fulfills the functions of the control apparatus is not a commercially available personal computer, such as the personal computer 130 illustrated in FIG. 26, but may be a dedicated product specific to the image display system 10. The functions of the control apparatus may be included in the HMD 11 itself. In this case, the HMD 11 itself functions as the control apparatus.

Alternatively, a network server different from the control server 12 may fulfill the functions of accumulating and distributing images, and the control server 12 may fulfill specific functions other than the functions of accumulating and distributing images. Further, not a network server such as the control server 12 but a local server placed in the home 14 may fulfill the functions of the control apparatus.

As described above, various modifications can be made to the hardware configuration of the computer that constitutes the control apparatus according to the present invention. The control apparatus can be constituted by a plurality of computers that are separated hardware units for the purpose of improving processing capacity and reliability. For example, the functions of the captured-image obtaining unit 70, the detection unit 73, and the time measurement unit 74, the functions of the evaluation unit 75, the information accepting unit 76, the information management unit 77, the selection unit 78, the album creation unit 79, and the display control unit 80, and the functions of the speech recognition unit 71 and the instruction accepting unit 72 may be distributed to and fulfilled by three respective computers. In this case, the three computers constitute the control apparatus.

As described above, the hardware configuration of the computer can be changed as appropriate in accordance with requested performance, such as processing capacity, safety, reliability, and so on. Further, in addition to the hardware, an application program, such as the operation program 60, can be duplicated or can be distributed to and stored in a plurality of storage devices for the purpose of attaining safety and reliability, as a matter of course.

Note that at least the information accepting unit 76, the information management unit 77, and the display control unit 80 need to be included in the control apparatus. For example, the speech recognition unit 71, the detection unit 73, and the time measurement unit 74 need not be included in the control apparatus and may be included in the HMD 11.

The HMD 11 need not be used in the home 14. As long as an environment in which connection with the control apparatus can be established is provided, the HMD 11 may be used in a building where the user 13 is staying or may be used outdoors.

In the embodiments described above, for example, the processing units that perform various types of processing, namely, the captured-image obtaining unit 70, the speech recognition unit 71, the instruction accepting unit 72, the detection unit 73, the time measurement unit 74, the evaluation unit 75, the information accepting unit 76, the information management unit 77, the selection unit 78, the album creation unit 79, the display control unit 80, the field-of-view image obtaining unit 118, the marker detection unit 119, the image editing unit 120, and the mode switching unit 125, are implemented as various processors as described below in terms of hardware structure.

The various processors include a CPU, a programmable logic device (PLD), a dedicated electric circuit, and so on. As is well known, a CPU is a general-purpose processor that executes software (program) to function as the processing units. A PLD is a processor, such as an FPGA (field-programmable gate array), for which the circuit configuration can be changed after manufacturing. A dedicated electric circuit is a processor, such as an ASIC (application-specific integrated circuit), having a circuit configuration specifically designed to perform a specific process.

One processing unit may be constituted by one of the various processors or a combination of two or more processors of the same type or different types (for example, a combination of a plurality of FPGAs or a combination of a CPU and an FPGA). Further, a plurality of processing units may be constituted by one processor. A first example configuration in which a plurality of processing units are constituted by one processor is a form in which one or more CPUs and software are combined to constitute one processor, and the processor functions as the plurality of processing units. A second example configuration is a form in which a processor that implements the functions of the entire system including the plurality of processing units with one IC chip is used, a representative example of the form being a form of using a system on a chip (SoC). As described above, in terms of hardware structure, the processing units are constituted by one or more of the processors described above.

Further, more specifically, in terms of hardware structure, these processors are implemented as electric circuitry obtained by combining circuit devices, such as semiconductor devices.

On the basis of the above description, an image display system described in additional item 1 below and a control apparatus for a head-mounted display described in additional item 2 below can be determined.

Additional Item 1

An image display system including: a head-mounted display that is worn on a head of a user; and a control apparatus for the head-mounted display, including:

a display control processor that causes a list in which a plurality of images are arranged to be displayed on the head-mounted display;

a detection processor that detects an eye gaze of the user directed at an image among the plurality of images;

a time measurement processor that measures an eye fixation duration of the user for the image on the basis of a result of detecting the eye gaze;

an information accepting processor that accepts information about the eye fixation duration; and an information management processor that records the image and the information about the eye fixation duration to a storage unit in association with each other.

Additional Item 2

A control apparatus for a head-mounted display that is worn on a head of a user, including:

a display control processor that causes a list in which a plurality of images are arranged to be displayed on the head-mounted display;

an information accepting processor that accepts information about an eye fixation duration of the user for an image among the plurality of images, the eye fixation duration being measured by a time measurement processor on the basis of a result of detection by a detection processor, the detection processor detecting an eye gaze of the user directed at the image; and an information management processor that records the image and the information about the eye fixation duration to a storage unit in association with each other.

In the present invention, any of the above-described embodiments and modifications can be combined as appropriate. For example, the first embodiment and the second embodiment may be combined and implemented, or the third embodiment and the fourth embodiment may be combined and implemented. The present invention is not limited to the above-described embodiments, and various configurations can be employed without departing from the spirit of the present invention, as a matter of course. Further, the present invention covers not only the program but also a recording medium storing the program.

REFERENCE SIGNS LIST 10 image display system
11, 11A, 11B, 115 head-mounted display (HMD)
12 control server (control apparatus)
13, 13A, 13B user
14 home
15 data center
16 network
25 main body part
26 band part
27 protective frame
28 screen
29 eye gaze detection camera
30 arm
31 microphone
32 cable
33 horizontal band
34 vertical band
40 wall
41 left hand
42 pedestal
43, 43A, 43B accumulation image
44, 44A, 44B list of accumulation images
45, 45A, 45B accumulation image list screen
50 storage device
51 memory
52 CPU
53 communication unit
54 data bus
60 operation program
61, 61E electronic album
62 evaluation criteria
63 image interest-level information
64 selection condition
70 captured-image obtaining unit
71 speech recognition unit
72 instruction accepting unit (addition instruction accepting unit, sharing instruction accepting unit, reproduction instruction accepting unit)
73 detection unit
74 time measurement unit
75 evaluation unit
76 information accepting unit
77 information management unit
78 selection unit
79 album creation unit
80 display control unit
85 captured image
86 inner corner of eye
87 iris
88 display region
90 folder
91 list of folders
92, 104, 106, 111 message
93 folder selection screen
95, 95A, 95B mark
96 reproduction display screen
97 enlarged image
100 image of interest
101 list of images of interest
102, 110 image-of-interest list screen
103 star
105 browse screen for electronic album
116 field-of-view camera
117 marker
118 field-of-view image obtaining unit
119 marker detection unit
120 image editing unit
121 field-of-view image
122 correspondence information
125 mode switching unit
130 personal computer (control apparatus)
135 portable computer (control apparatus)
ARS augmented reality space
RS real space
VS virtual space
LSP, LSP-A, LSP-B eye gaze point
S100 to S160, S200 to S260 step

What is claimed is:

1. An image display system comprising: a head-mounted display that is worn on a head of a user; and a control apparatus for the head-mounted display, comprising:

a display control unit that causes a list in which a plurality of images are arranged to be displayed on the head-mounted display;

a detection unit that detects an eye gaze of the user directed at an image among the plurality of images;

a time measurement unit that measures an eye fixation duration of the user for the image on the basis of a result of detecting the eye gaze;

an information accepting unit that accepts information about the eye fixation duration; and an information management unit that records the image and the information about the eye fixation duration to a storage unit in association with each other, wherein the user is one of a plurality of users, and the display control unit causes lists to be simultaneously displayed on respective head-mounted displays that are worn by the plurality of users, and the image display system further comprising:
   a sharing instruction accepting unit that accepts a sharing instruction from the user; and
   a mode switching unit that switches between a shared mode in which an eye fixation target image is indicated for the plurality of users and a non-shared mode in which the eye fixation target image is not shared among the plurality of users, the eye fixation target image being the image in the list at which the eye gaze of the user that has given the sharing instruction, which is an instructing user, is directed.

2. The image display system according to claim 1, further comprising
   a selection unit that selects at least one image of interest from among the plurality of images in accordance with the information about the eye fixation duration from the information management unit.

3. The image display system according to claim 2, further comprising
   an album creation unit that creates an electronic album constituted by a group of some of the plurality of images, wherein
   in a case where the image of interest is selected, the album creation unit creates the electronic album that includes the image of interest.

4. The image display system according to claim 3, wherein
   the display control unit causes the image of interest and the electronic album to be displayed on the head-mounted display,
   the image display system further comprises an addition instruction accepting unit that accepts an addition instruction from the user for adding the image of interest to the electronic album, and
   the album creation unit creates the electronic album in response to the addition instruction.

5. The image display system according to claim 1, wherein
   the display control unit causes a mark to be displayed on the eye fixation target image in each of the lists in the shared mode, and causes the mark to be displayed on one of the plurality of images in each of the lists at which an eye gaze of a corresponding one of the plurality of users is directed in the non-shared mode.

6. The image display system according to claim 1, wherein
   the sharing instruction accepting unit accepts the sharing instruction that is given by a spoken utterance of the user.

7. The image display system according to claim 1, further comprising an evaluation unit that replaces the eye fixation duration with an interest level of the user for the image on the basis of an evaluation criterion, wherein
   the information management unit records the interest level as the information about the eye fixation duration.

8. The image display system according to claim 1, further comprising
   a reproduction instruction accepting unit that accepts a reproduction instruction from the user for reproducing the image, wherein
   the display control unit allows the user to recognize, through the head-mounted display, an augmented reality space obtained by merging a real space with a virtual space, and causes the image to be reproduced and displayed on an actual object in the real space in response to the reproduction instruction.

9. A control apparatus for a head-mounted display that is worn on a head of a user, comprising:
   a display control unit that causes a list in which a plurality of images are arranged to be displayed on the head-mounted display;
   an information accepting unit that accepts information about an eye fixation duration of the user for an image among the plurality of images, the eye fixation duration being measured by a time measurement unit on the basis of a result of detection by a detection unit, the detection unit detecting an eye gaze of the user directed at the image; and
   an information management unit that records the image and the information about the eye fixation duration to a storage unit in association with each other, wherein
   the user is one of a plurality of users, and the display control unit causes lists to be simultaneously displayed on respective head-mounted displays that are worn by the plurality of users, and
   the control apparatus further comprising:
      a sharing instruction accepting unit that accepts a sharing instruction from the user; and
      a mode switching unit that switches between a shared mode in which an eye fixation target image is indicated for the plurality of users and a non-shared mode in which the eye fixation target image is not shared among the plurality of users, the eye fixation target image being the image in the list at which the eye gaze of the user that has given the sharing instruction, which is an instructing user, is directed.

10. An operation method for a control apparatus for a head-mounted display that is worn on a head of a user, comprising:
   a display control step of causing a list in which a plurality of images are arranged to be displayed on the head-mounted display;
   an information accepting step of accepting information about an eye fixation duration of the user for an image among the plurality of images, the eye fixation duration being measured by a time measurement unit on the basis of a result of detection by a detection unit, the detection unit detecting an eye gaze of the user directed at the image; and
   an information management step of recording the image and the information about the eye fixation duration to a storage unit in association with each other, wherein
   the user is one of a plurality of users, and the display control step causes lists to be simultaneously displayed on respective head-mounted displays that are worn by the plurality of users, and the operation method further comprising:
- a sharing instruction accepting step that accepts a sharing instruction from the user; and
- a mode switching step that switches between a shared mode in which an eye fixation target image is indicated for the plurality of users and a non-shared mode in which the eye fixation target image is not shared among the plurality of users, the eye fixation target image being the image in the list at which the eye gaze of the user that has given the sharing instruction, which is an instructing user, is directed.

* * * * *